US008507048B2

(12) United States Patent
Kim et al.

(10) Patent No.: US 8,507,048 B2
(45) Date of Patent: Aug. 13, 2013

(54) APPARATUS AND METHOD FOR APPLYING A FILM ON A SUBSTRATE

(75) Inventors: Kyekyoon Kim, Champaign, IL (US); Hyungsoo Choi, Champaign, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 0 days.

(21) Appl. No.: 13/218,733

(22) Filed: Aug. 26, 2011

(65) Prior Publication Data

US 2011/0311731 A1   Dec. 22, 2011

Related U.S. Application Data

(62) Division of application No. 12/421,676, filed on Apr. 10, 2009, now Pat. No. 8,025,025.

(60) Provisional application No. 61/044,350, filed on Apr. 11, 2008.

(51) Int. Cl.
*B05D 1/04* (2006.01)

(52) U.S. Cl.
USPC .................... 427/483; 427/475; 427/479

(58) Field of Classification Search
USPC ........................... 427/475, 479, 483
See application file for complete search history.

(56) References Cited

U.S. PATENT DOCUMENTS

| 4,574,092 | A | | 3/1986 | Gourdine |
| 4,748,043 | A | * | 5/1988 | Seaver et al. ................. 427/482 |
| 4,762,553 | A | | 8/1988 | Savage et al. |
| 4,762,975 | A | | 8/1988 | Mahoney et al. |
| 5,344,676 | A | | 9/1994 | Kim et al. |
| 5,916,640 | A | * | 6/1999 | Liu et al. ........................ 427/475 |
| 5,948,483 | A | | 9/1999 | Kim et al. |
| 6,660,090 | B2 | | 12/2003 | Choy et al. |
| 2003/0077399 | A1 | | 4/2003 | Potyrailo et al. |
| 2004/0008243 | A1 | | 1/2004 | Sekiya |
| 2004/0182948 | A1 | | 9/2004 | Yogi et al. |
| 2005/0133616 | A1 | | 6/2005 | Shimoda et al. |
| 2006/0110544 | A1 | | 5/2006 | Kim et al. |

OTHER PUBLICATIONS

Gu et al., "Flow-Limited Field-Injection Electrostatic Spraying for Controlled Formation of Charged Multiple Jets of Precursor Solutions: Theory and Application", Applied Physics Letters 87, 2005, pp. 084107-1 to 084107-3.

(Continued)

*Primary Examiner* — Frederick Parker
(74) *Attorney, Agent, or Firm* — Guntin & Gust, PLC; Ed Guntin

(57) ABSTRACT

The subject disclosure provides a method for applying dissimilar electrical charges to portions of a plurality of applicators by way of a conductor included in a conduit of each applicator. The method further includes causing each applicator to generate one or more jet sprays of a liquid received by each applicator for application of a material on a substrate, where one or more portions of the material on the substrate have one or more net charges associated with the dissimilar electrical charges applied to the portions of the plurality of applicators, where the conductor of each applicator is a sleeve positioned in the applicator, and where a diameter of the sleeve results in one of an outer surface of the sleeve contacting a surface of the conduit, or the outer surface of the sleeve having a separation from the surface of the conduit of the applicator. Additional embodiments are disclosed.

15 Claims, 24 Drawing Sheets

(56) References Cited

OTHER PUBLICATIONS

Kim et al., "Generation of Charged Drops of Insulating Liquids by Electrostatic Spraying", Journal of Applied Physics, vol. 47, No. 5, May 1975, pp. 1964-1969.

Wikipedia, "Electrospinning", 7-page article; http://en.wikipedia.org/wiki/Electrospinning; Web Site last visited Mar. 13, 2009.

Wikipedia, "File:Electrospinning setup.png", 2-page article; http://en.wikipedia.org/wiki/File:Electrospinning_setup.png; Web Site last visited Mar. 2, 2009.

Wikipedia, "Taylor Cone", 2-page article; http://en.wikipedia.org/wiki/Taylor_cone; Web Site last visited Mar. 2, 2009.

\* cited by examiner

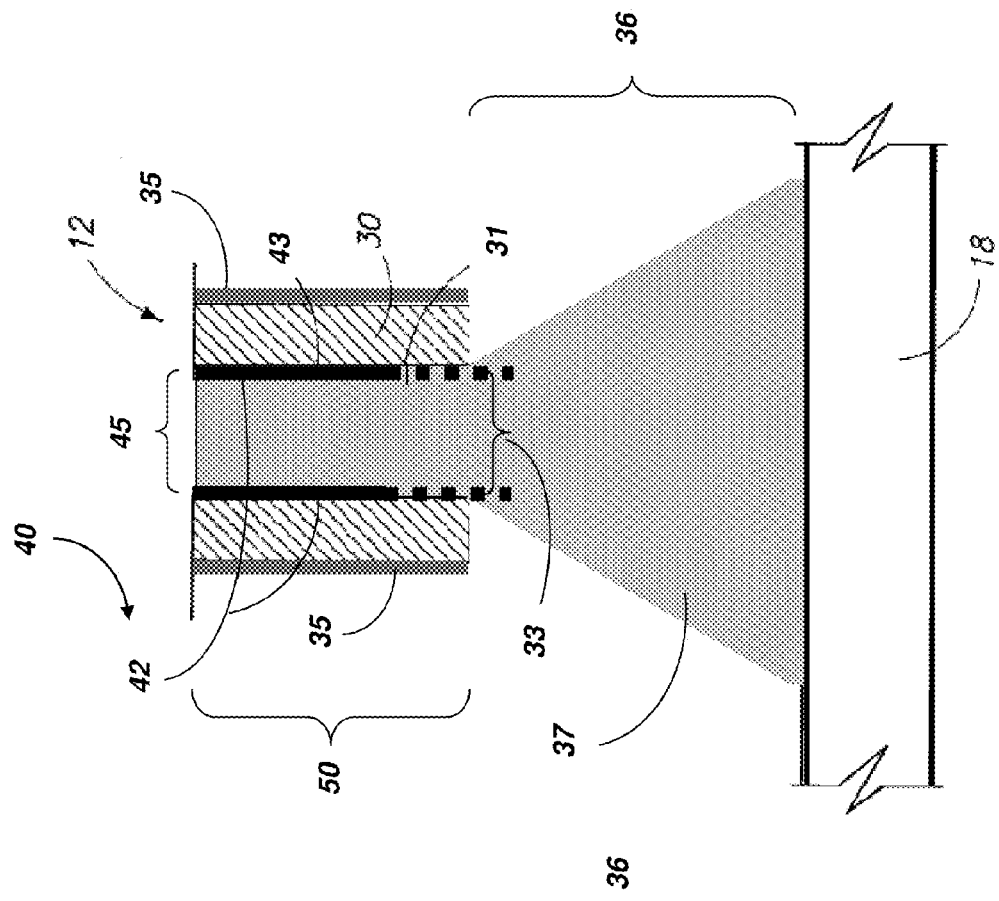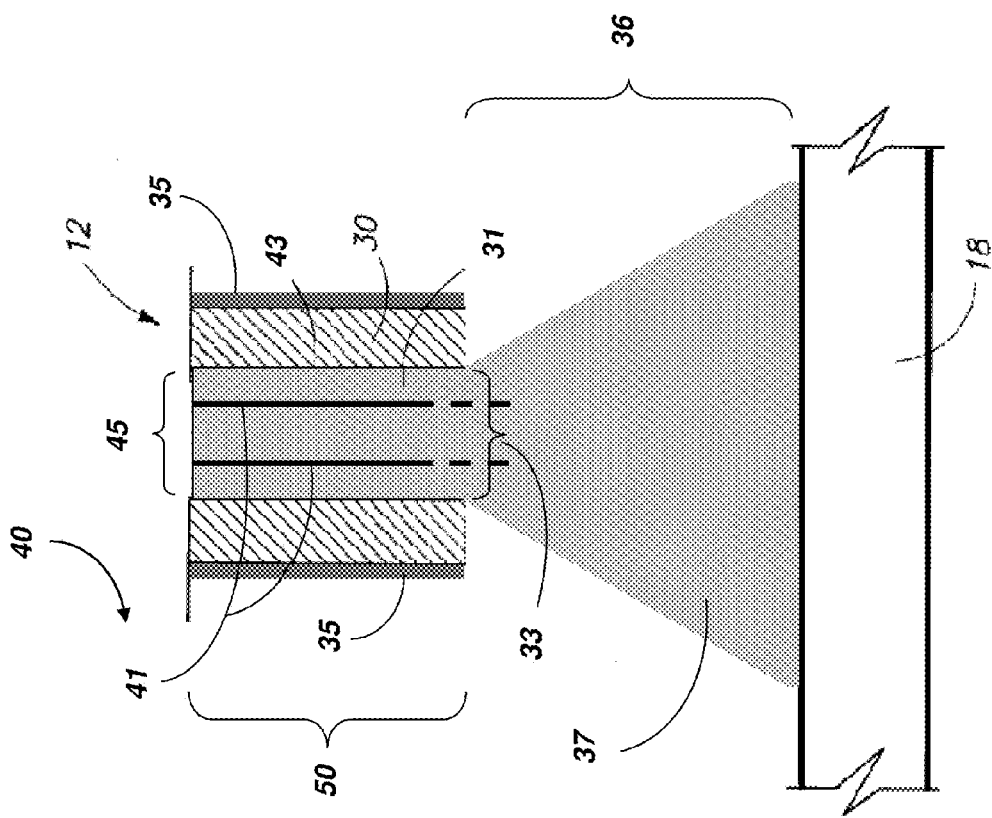

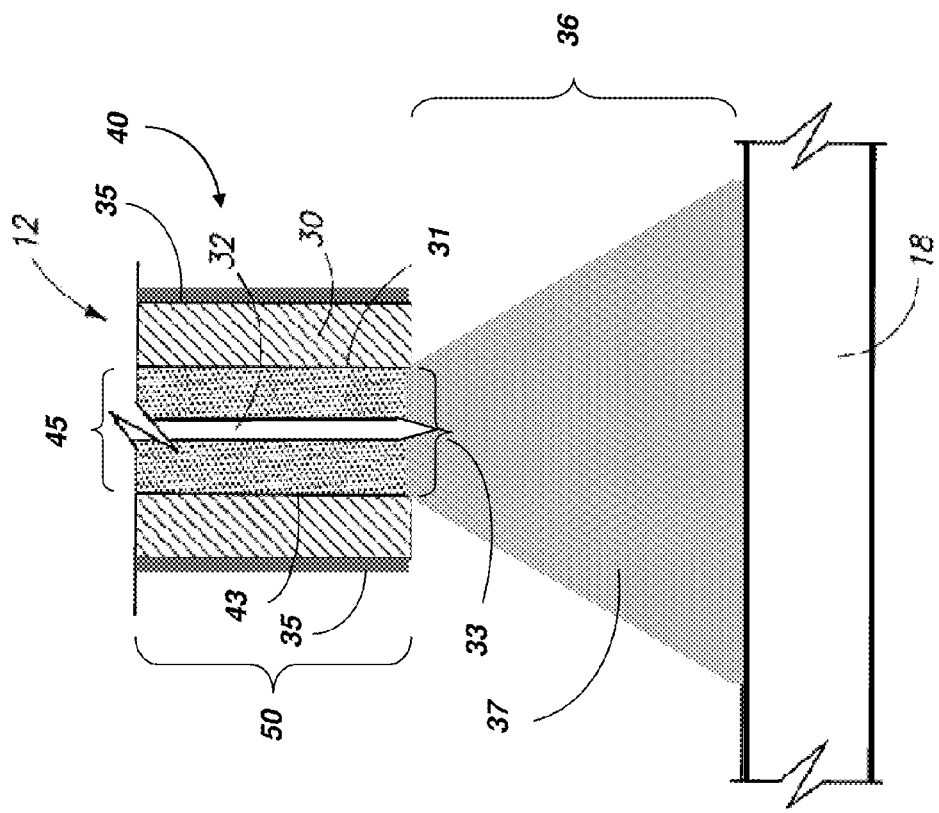
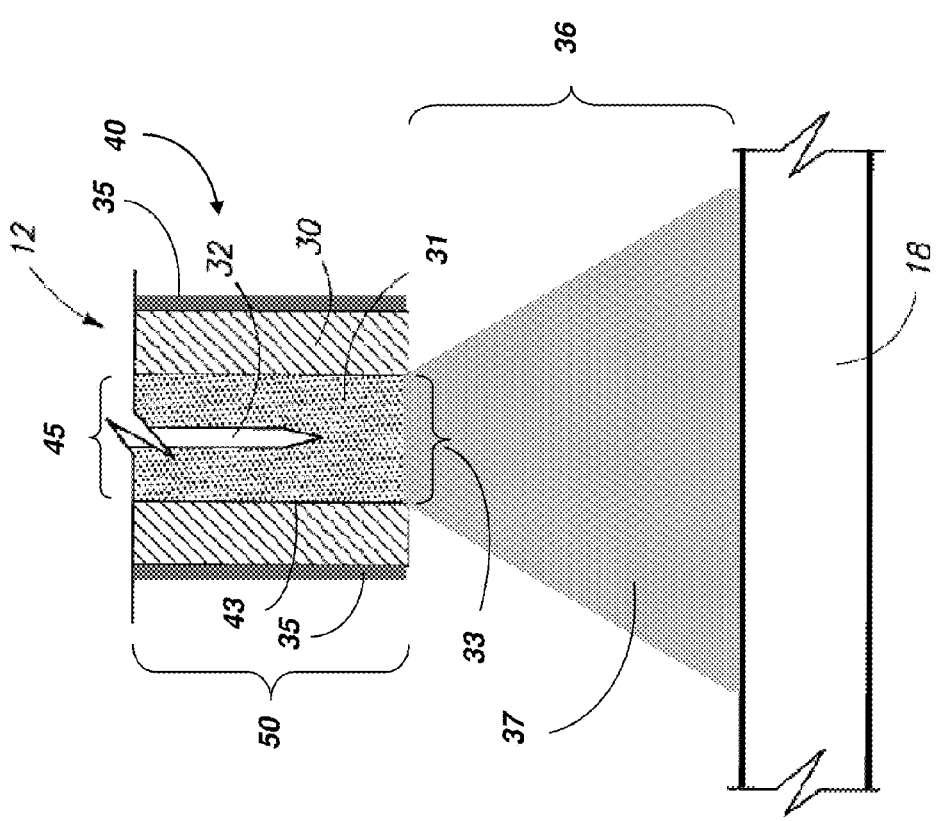

High charge accumulation at the liquid surface produces a stable multi-jet spray with even jet spacing.

|   | Solution Concentration (mole/L) | Solute | Solvent | Product | Nature of Product |
|---|---|---|---|---|---|
| 1 | 0.1 M | Zn-trifluoroacetate | Methanol | ZnO | piezoelectric, semiconductor thin films |
| 2 | 0.1 M<br>0.2 M<br>0.3 M | Y-trifluoroacetate<br>Ba-trifluoroacetate<br>Cu-trifluoroacetate | Methanol | $YBa_2Cu_3O_7$ | superconductor thin films |
| 3 | 0.1 M | Pd-trifluoroacetate | Water | Pd | metallic nanoparticles |
| 4 | 0.1 M | Ta-ethoxide | Methanol | $Ta_2O_5$ | insulator, thin films and nanoparticles |
| 5 | 0.1 M | Ag-trifluoroacetate | Methanol | Ag | metallic nanoparticles |
| 6 | 0.1 M<br>0.1 M | Pd-trifluoroacetate<br>Ag-trifluoroacetate | Methanol<br>Methanol | $Pd_{0.5}Ag_{0.5}$ | inter-metallic nanoparticles |

FIG. 26   TABLE 1

$BaTiO_3$, $SrTiO_3$, BST, ZnO, Iron Oxide, NiO, Cobalt Oxide, PZT, PZN, MgO, $TiO_2$, TiON, $SiO_2$, $Al_2O_3$, Mn-doped $Zn_2SiO_4$, Cu, Ag, Ni, Pd, PVA, $MgF_2$, $CaF_2$, PEDOT, GCP, Other polymers

FIG. 27   TABLE 2

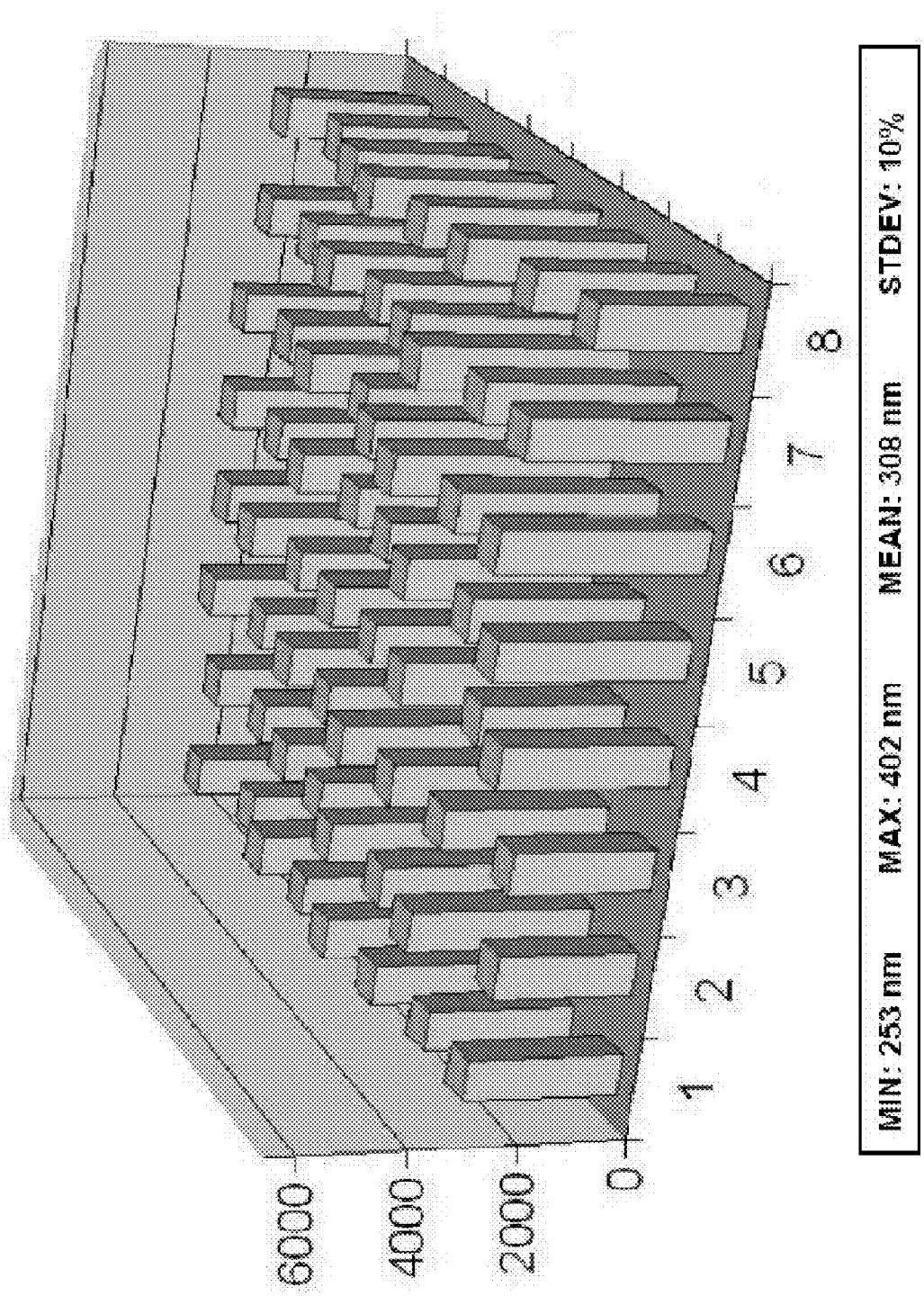
FIG. 28  TABLE 3

US 8,507,048 B2

APPARATUS AND METHOD FOR APPLYING A FILM ON A SUBSTRATE

CROSS-REFERENCE TO RELATED APPLICATIONS

The present application is a divisional of U.S. patent application Ser. No. 12/421,676, filed Apr. 10, 2009, and issued as U.S. Pat. No. 8,025,025, which claims the benefit of priority to U.S. Provisional Application Ser. No. 61/044,350 filed on Apr. 11, 2008, which are hereby incorporated herein by reference in their entirety.

FIELD OF THE DISCLOSURE

The present disclosure relates generally to techniques for applying a material on a substrate, and more specifically to apparatuses and methods for applying one or more materials on one or more substrates.

BACKGROUND

In an electrostatic spraying apparatus, electric charge can be supplied to a surface of a liquid. When the repulsive forces within the liquid caused by the electric charge exceed the surface tension maintaining the surface of the liquid, the surface of the liquid can explosively disrupt to form small jets. In some applications, the small jets can break up into streams of charged liquid clusters in the form of nanodrops (liquid phase) or nanoparticles (solid phase formed by solidifying nanodrops). The resulting stream of nanodrops can be directed onto a surface of a target material or substrate, which over time, can form a film on the surface.

The charged nanodrops can collect on the surface and form a space charge build-up which can result in non-uniform applications of the multi-jet sprays of nanoparticles on the substrate. An electrically insulated substrate cannot efficiently transport charge away from its surface. Consequently, certain areas of the substrate's surface can accumulate the charge of the applied nanodrops. The accumulated charge can repel additional applications of nanodrops which can cause the non-uniform application of nanodrops on the substrate.

BRIEF DESCRIPTION OF THE DRAWINGS

FIGS. 2A-2D depict illustrative embodiments of an applicator portion of the apparatus;

FIGS. 26-27, Tables 1-2, respectively, depict illustrations of possible embodiments of a liquid used by the apparatus of FIG. 1, 2, 17, or 18 for spray application on a substrate; and FIG. 28, Table 3 depicts an illustrative embodiment of a PEDOT:PSS thin film sprayed on a glass substrate showing a measured thickness of 64 points distributed uniformly over the substrate.

DETAILED DESCRIPTION

Figure 1A:
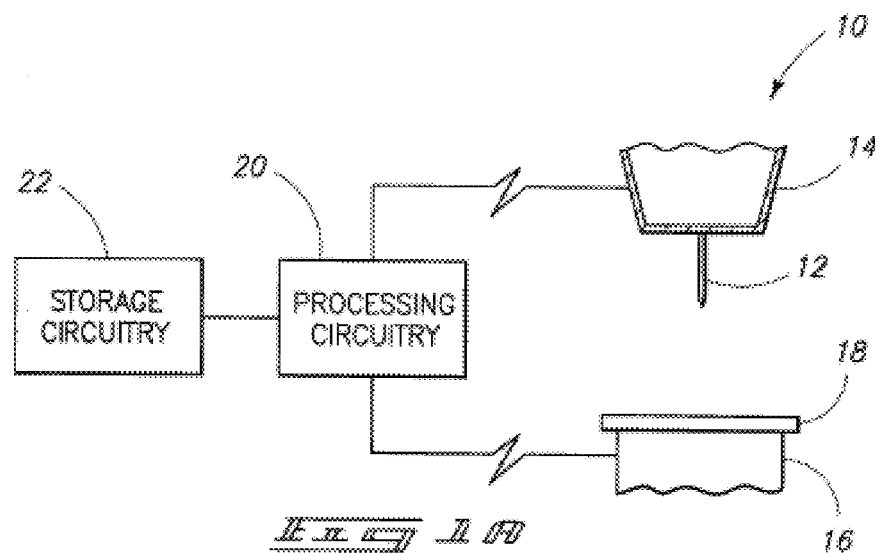
FIGS. 1A-1B depict an illustrative embodiment of a material application apparatus.
Figure 1B:
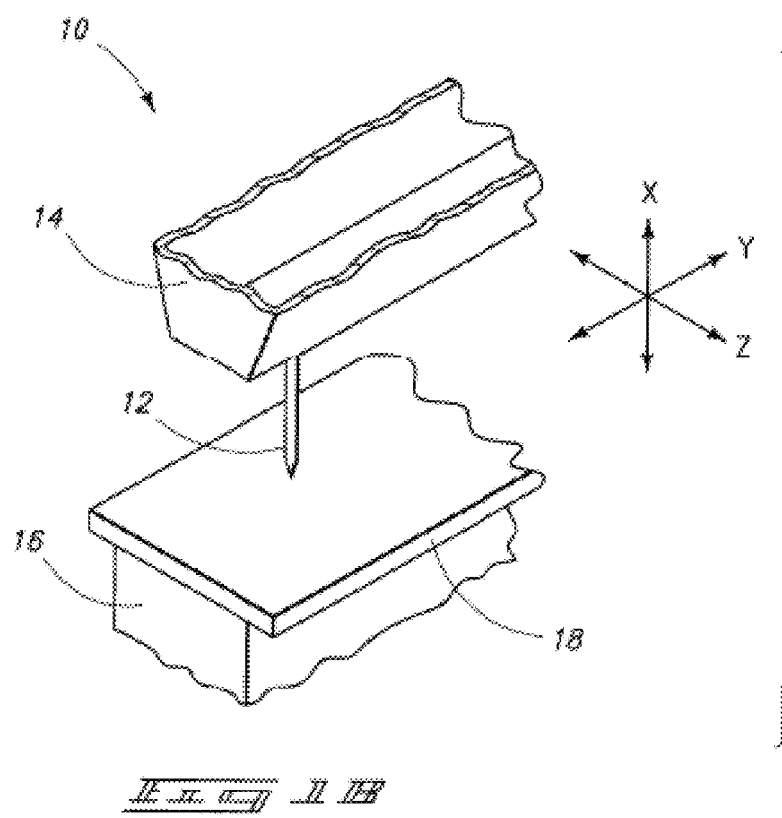
Figure 3:
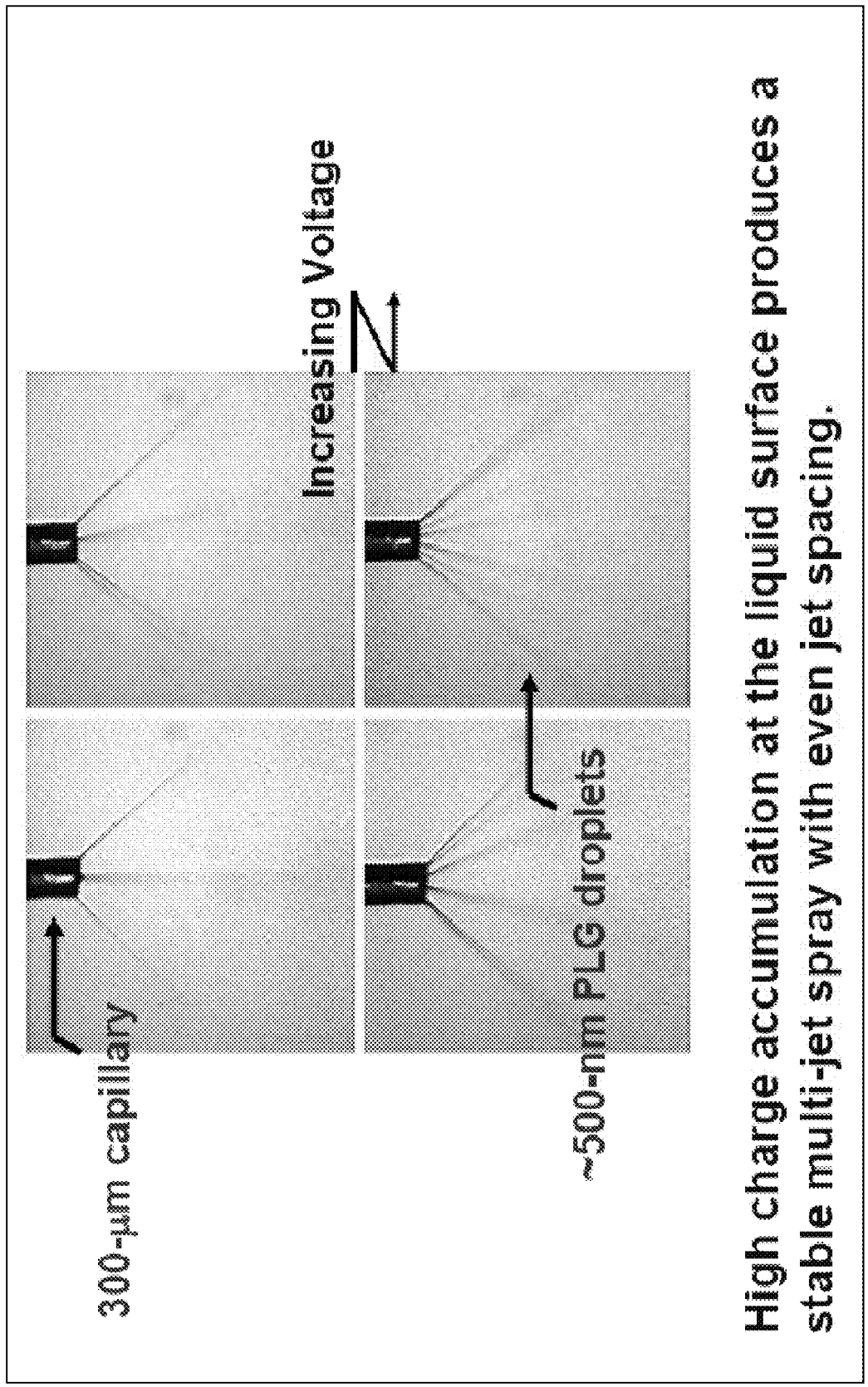
FIGS. 3-10 depict illustrative embodiments of jet sprays generated by the apparatus of FIG. 1.
Figure 4:
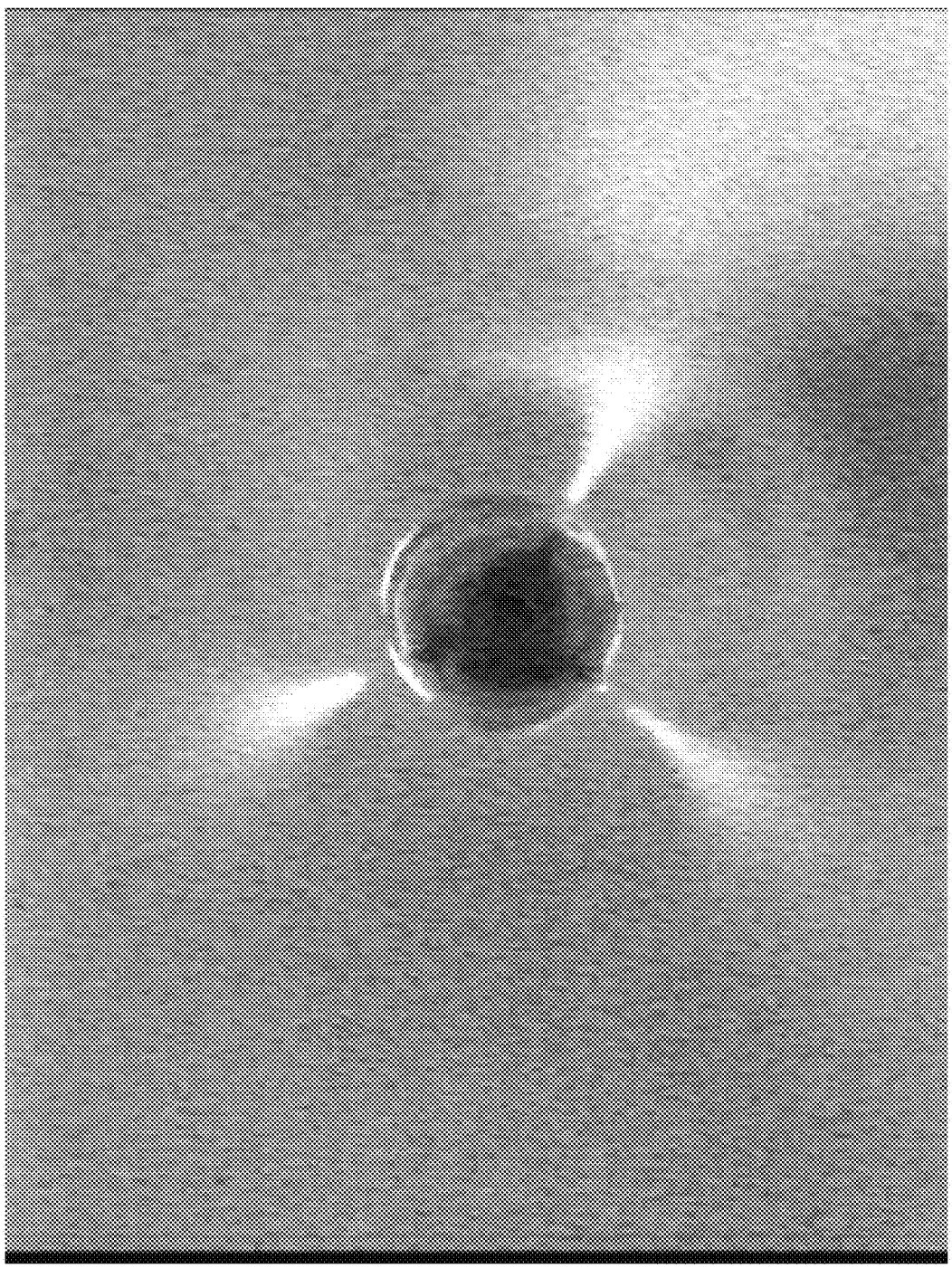
Figure 5:
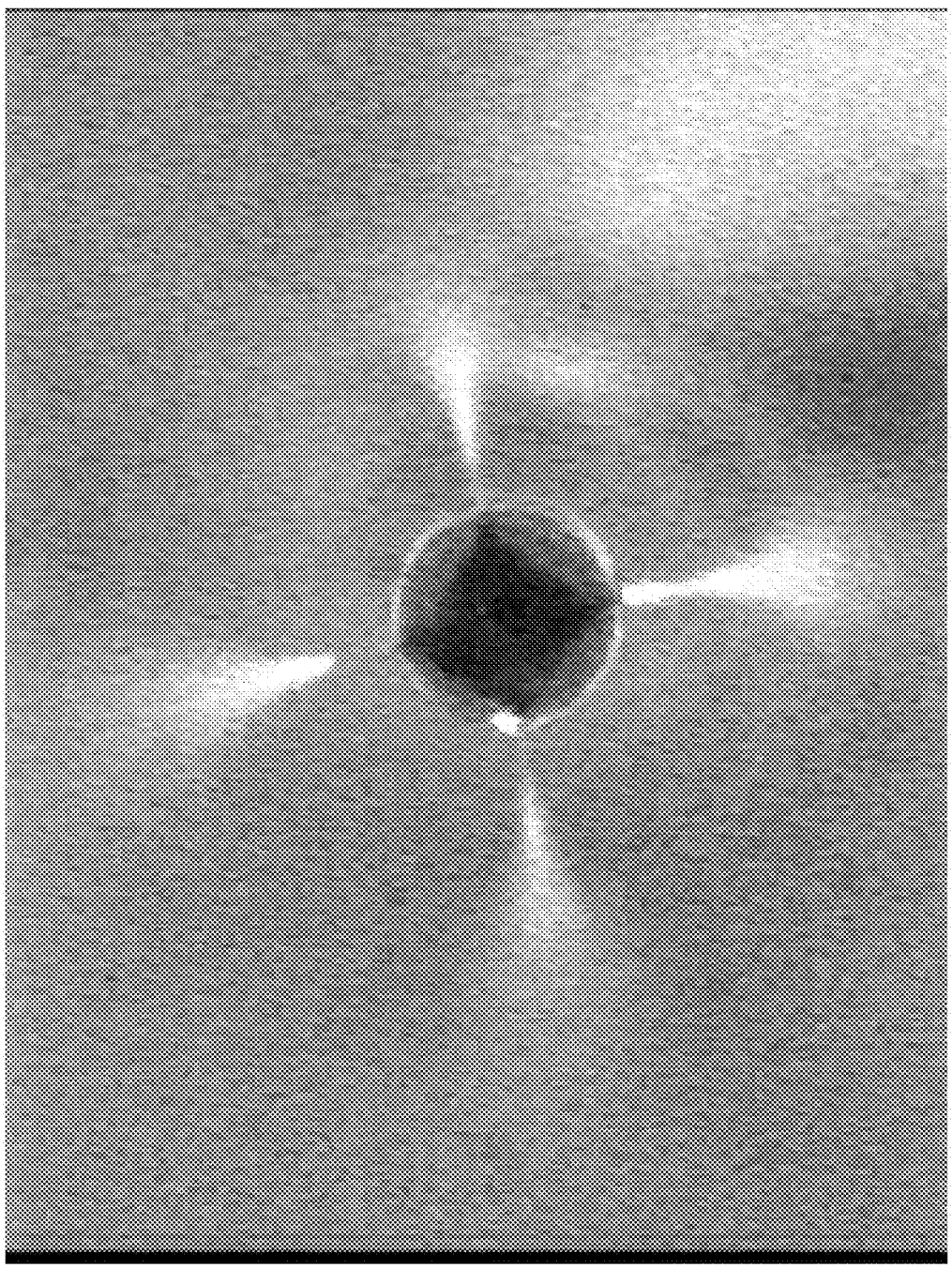
Figure 6:
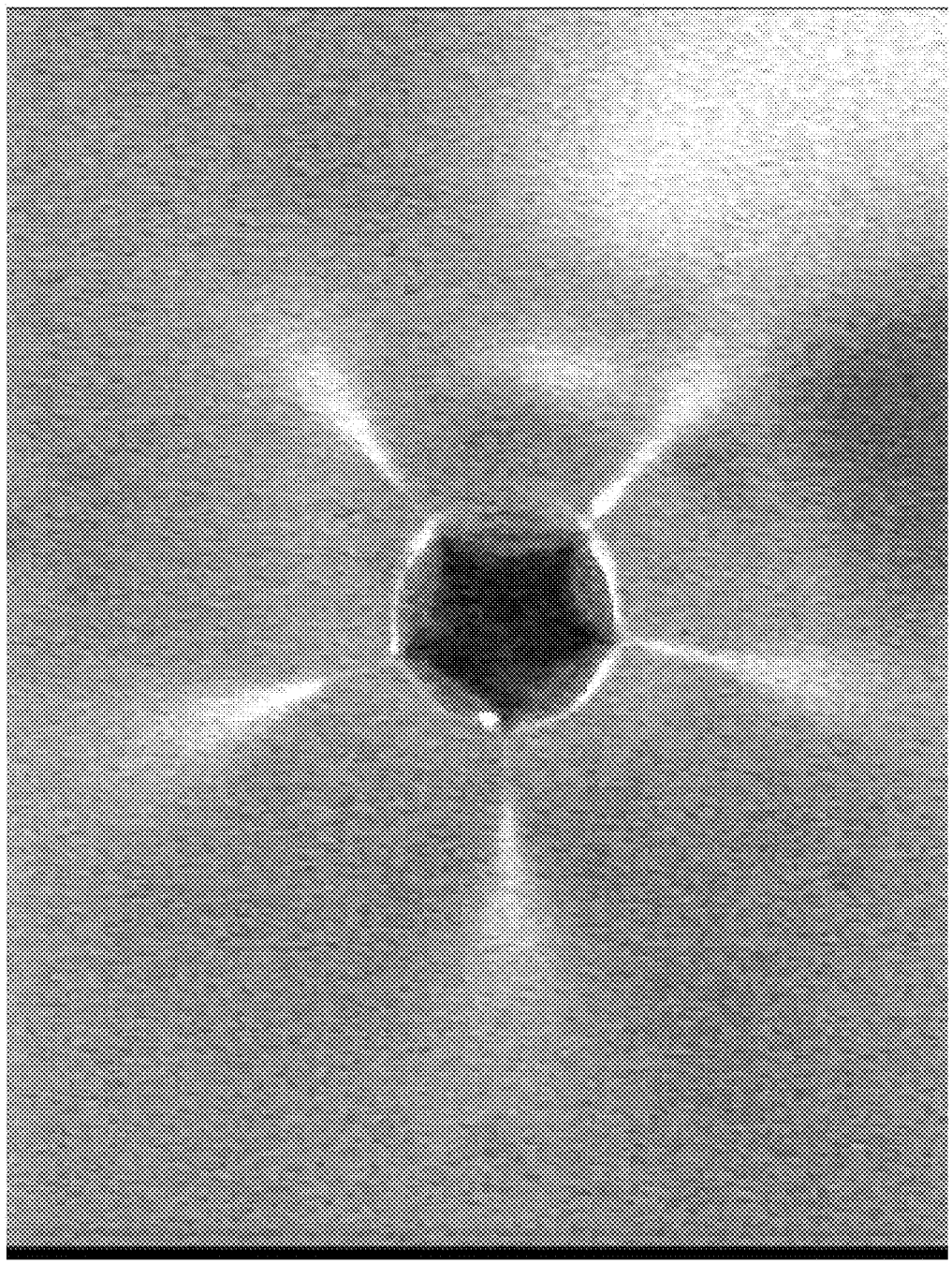
Figure 7:
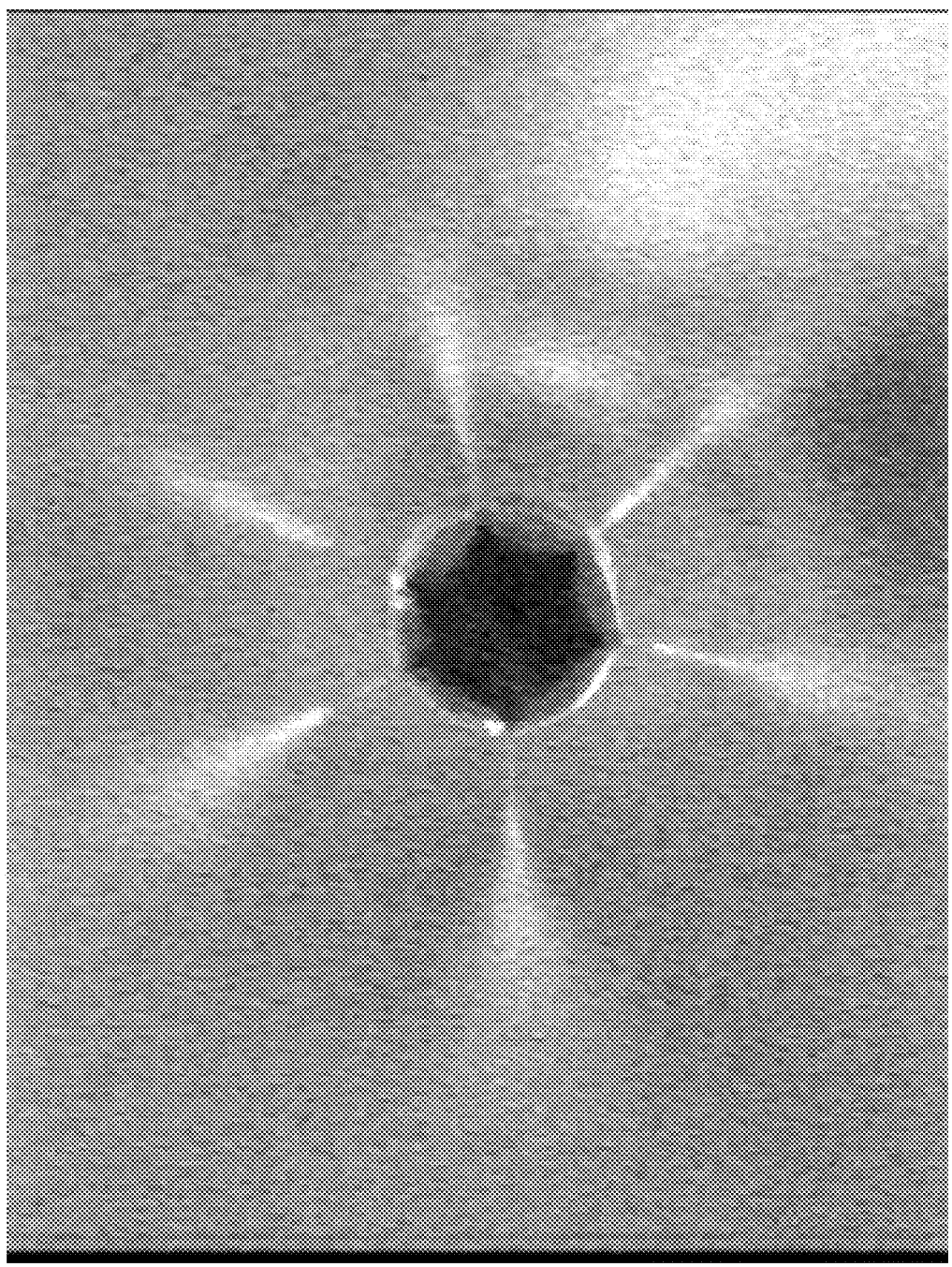
Figure 8:
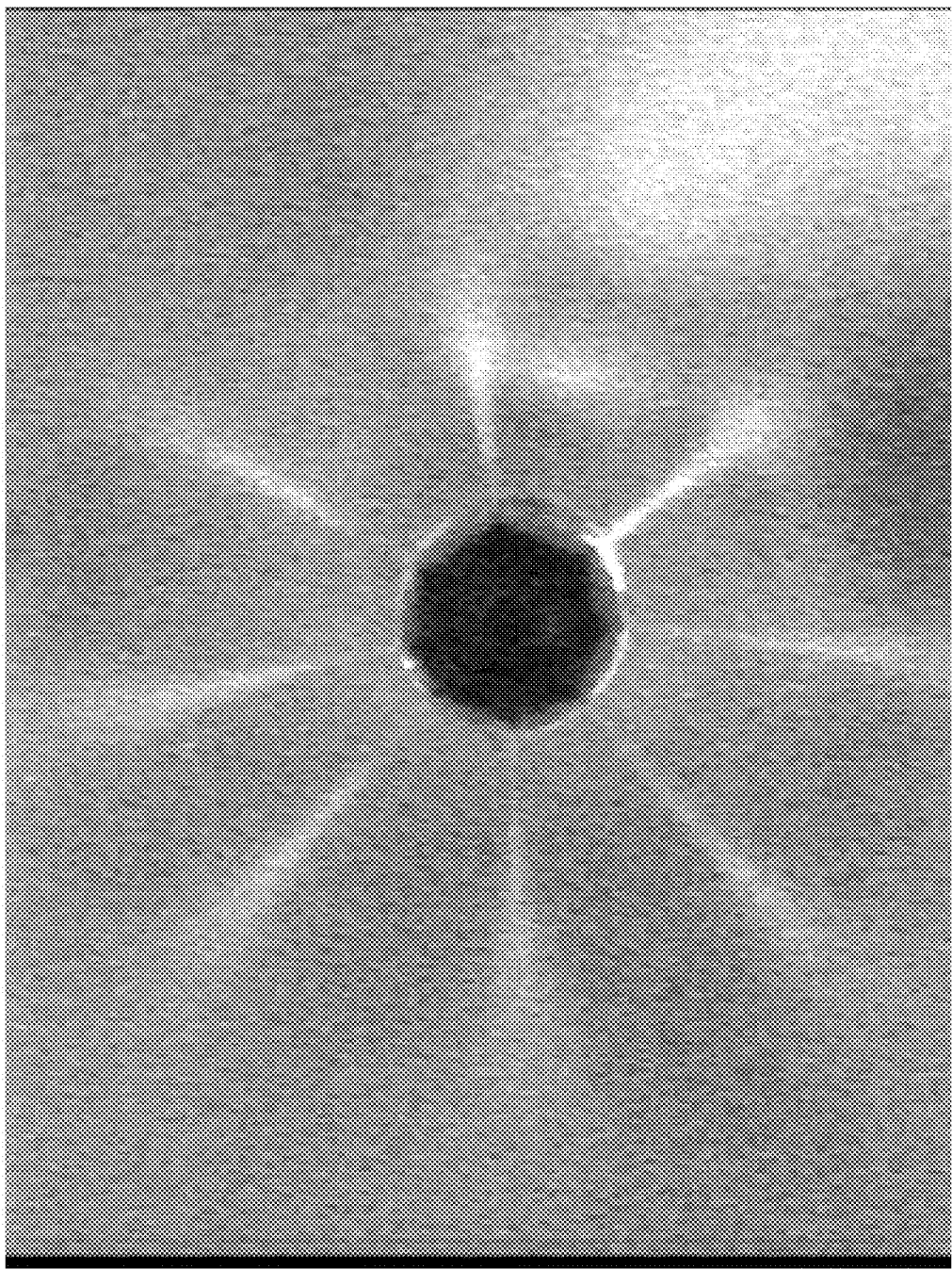
Figure 9:
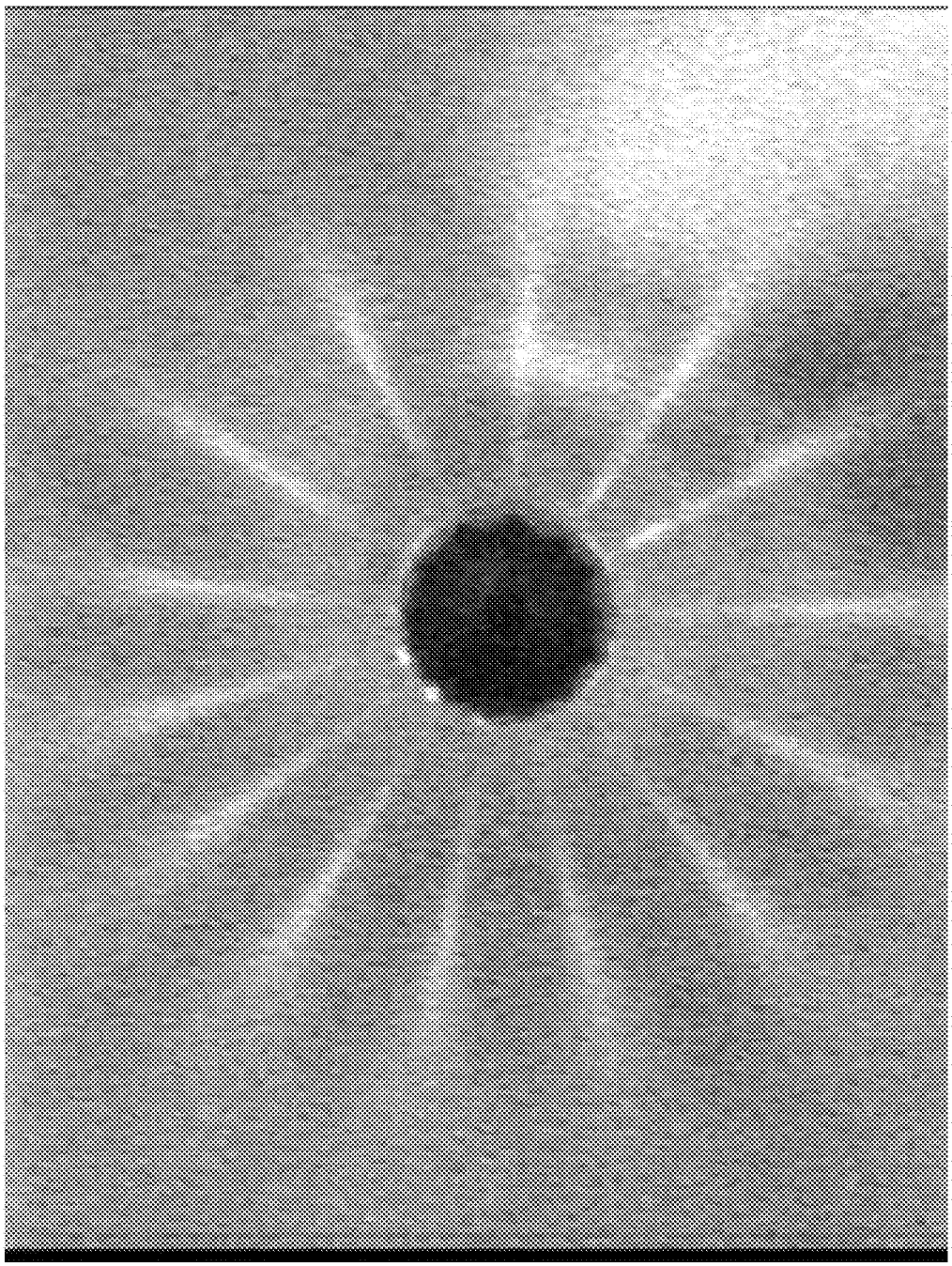
Figure 10:
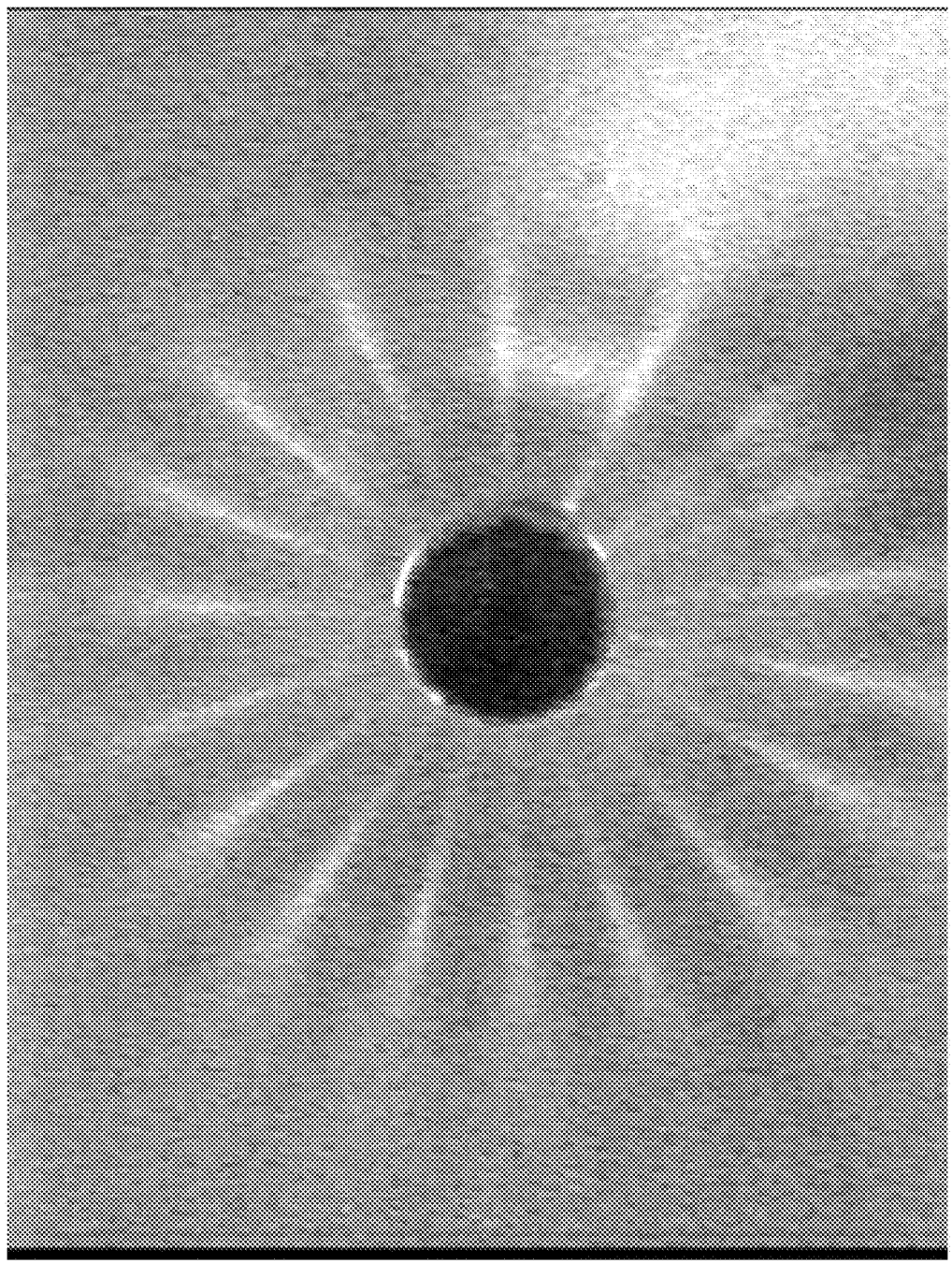

One embodiment of the present disclosure entails an apparatus having a plurality of applicators, each applicator with an ingress opening to receive a liquid, and an egress opening to release the liquid, and a conductor positioned in a conduit of each of the plurality of applicators, the conductor and the conduit having dimensions to cause a surface tension of the liquid to prevent a constant flow of the liquid from the egress opening. Each conductor of the plurality of applicators can be coupled to one of one or more power sources operable to apply a charge to the liquid to overcome the surface tension and form at the egress opening of each applicator a plurality of jet sprays of the liquid applicable on a substrate to form a thin film. The one or more power sources can be operable to apply alternate charge polarities to portions of the plurality of applicators to create one or more desired net charges for one or more corresponding portions of the thin film.

One embodiment of the present disclosure entails an apparatus having a plurality of applicators to receive and apply a liquid to a substrate, and a conductor positioned in a conduit of each of the plurality of applicators. One or more power sources can be operable to apply dissimilar electrical charges to portions of the plurality of applicators by way of their corresponding conductors to cause each applicator to generate one or more jet sprays of the liquid for application on the substrate. One or more portions of the applied material on the substrate can have one or more corresponding net charges One embodiment of the present disclosure entails applying dissimilar electrical charges to portions of a plurality of applicators by way of a conductor included in a conduit of each applicator to cause each applicator to generate one or more jet sprays of a liquid received by each applicator for application on a substrate.

One embodiment of the present disclosure entails manufacturing a device in part by applying dissimilar electrical charges to portions of a plurality of applicators by way of a conductor included in a conduit of each applicator to cause each applicator to generate one or more jet sprays of a liquid received by each applicator for application on a component of the device.

One embodiment of the present disclosure entails a device having a component constructed in part by applying dissimilar electrical charges to portions of a plurality of applicators by way of a conductor included in a conduit of each applicator to cause each applicator to generate one or more jet sprays of a liquid received by each applicator for application on the component.

One embodiment of the present disclosure entails a computer-readable storage medium having computer instructions to control an apparatus that applies dissimilar electrical charges to portions of a plurality of applicators by way of a conductor included in a conduit of each applicator to cause each applicator to generate one or more jet sprays of a liquid received by each applicator for application on a substrate.

FIGS. 1A and 2A illustrate an apparatus 10 for applying on a substrate 18 a film with a multi-jet spray generated by the apparatus 10. Apparatus 10 can include generally an applicator 12 configured to receive a liquid from reservoir 14. While referred to as reservoir 14, element 14 can also be a conduit configured to convey and/or channel a solution to be deposited from a syringe pump or other liquid injection source. The substrate 18 can be coupled to a stage 16 which can be moved in at least one dimension (X, Y, and/or Z) using a common linear motor, or similar mechanism.

The applicator 12 can also be attached to a similar mechanism so that its location can be controlled on any axis (X, Y, and/or Z). The present disclosure contemplates that any combination of the applicator 12 and the stage 16 can be coupled to a mechanism that controls relative positioning between the applicator 12 and the substrate 18 attached to the stage 16. Configuring apparatus 10 in such a manner can allow an operator to arrange applicator 12 with sufficient proximity to substrate 18 to apply film patterns of any kind.

The apparatus 10 can include processing circuitry 20 and storage circuitry 22. Processing circuitry 20 can be coupled to either one or both of the stage 16 and applicator 12. Processing circuitry 20 can be implemented as a controller or other structure configured to execute instructions including, for example, software and/or firmware instructions. Other example embodiments of processing circuitry 20 can include a desktop or laptop computer, a server, a mainframe, customized hardware logic, and/or in structures such as a PGA, FPGA, or ASIC configured for controlling operations of the apparatus 10.

The processing circuitry 20 can be configured to control the operational parameters of the applicator 12 and the stage component 16. Configurable parameters of the applicator 12 and stage 16 can include the charge density of the liquid, the flow rate of the liquid traveling through the applicator 12, monitoring the viscosity and the dielectric constant of the liquid flowing through applicator 12, relative positioning of the applicator 12 and the substrate 18 held by the stage 16, temperature control of the substrate 18 by way of a common temperature control device, and so on.

Processing circuitry 20 can also be configured to store and access data from storage circuitry 22. Storage circuitry 22 can be configured to store in a processor useable media electronic data and/or programming data such as executable instructions (e.g., software and/or firmware), or other digital information. Processor useable media can include any article of manufacture which can contain, store, or maintain programming, data, and/or other digital information for use by or in connection with an instruction execution system such as the processing circuitry 20.

For example, processor useable media may include any one of physical media such as electronic, magnetic, optical, electro-magnetic, or semiconductor storage media. Some specific examples of processor useable media include, but are not limited to, a portable magnetic computer diskette, such as a floppy diskette, zip disc, hard drive, random access memory, read only memory, flash memory, cache memory, and/or other configurations capable of storing programming instructions, data, or other digital information.

Storage circuitry 22 can for example be used to store a plurality of data sets. These data sets can include specific parameters for specific substrates and liquids being deposited on the substrates. For example, in certain instances where a film of silver is deposited from a silver liquid solution from reservoir 14 via applicator 12 over a glass substrate 18, storage circuitry 22 can include a data set specific to any combination of deposition parameters. These parameters can include, for example, the type of solution, the type of substrate, the desired pattern, the flow rate parameter, a liquid charge density parameter, temperature control of the substrate, and so on.

FIGS. 2A-2D describe embodiments of a portion of the applicator 12 operating as a nozzle 50 for depositing and/or applying a film of material on a substrate 18 by way of multi-jet sprays 37. The nozzle 50 can include a tube 30 such as a capillary tube having a conduit 43 with an ingress opening 45 and an egress opening 33. The capillary tube can be of insulating material. The ingress opening 45 can be coupled to the reservoir 14 of FIG. 1A or another form of a fluid delivery device such as a syringe pump for directing liquid 31 through the tube 30 (see FIG. 16).

An electrical conductor 40 can be positioned in the conduit 43 of the tube 30 in a variety of ways to control the charge density of the liquid 31. The conductor 40 can be of any material with conductive properties for applying a charge to the liquid 31. In an embodiment, the electrical conductor 40 can be in the form of a hollow cylinder 41 such as a "sleeve" (herein referred to as sleeve 41) illustrated by the cross-section of FIG. 2A. The sleeve 41 can be co-axially positioned in the conduit 43 so that some of the liquid 31 travels within the inner walls of the sleeve 41 and a portion travels between the sleeve 41 and the conduit 43. Although the sleeve 41 is shown to have an axial length and positioning that does not extend from the ingress opening 33, other embodiments are possible.

For instance, the sleeve 41 can be shorter than what is shown in FIG. 2A, or it can be longer. The sleeve 41 can reach or extend beyond the egress opening 33 as shown by the dashed lines. The sleeve 41 can have a wider or narrower diameter than is shown. The sleeve 41 does not have to be co-axially positioned in the conduit 43, it can be positioned closer to one side of the conduit 43 than the other. The thickness of the walls of the sleeve 41 can be thick or thin. Any number of suitable embodiments of the sleeve 41 are applicable to the present disclosure.

In another embodiment, the electrical conductor 40 can be in the form of a hollow cylinder 42 such as a "sleeve" (herein referred to as sleeve 42) coupled to the inside walls of the conduit 43 of the tube 30 as illustrated by the cross-section of FIG. 2B. Similar to the previous embodiment, the sleeve 42 can be coaxially positioned in the conduit 43 or with an offset, have an axial length less than or extending from the egress opening 33 (see dashed lines), have a variety of thicknesses, and so on.

Each of the applicators 12 of FIGS. 2A-2B can also include electrical insulators 35. Insulator 35 can be grounded for example to insulate the applicator 12 from other applicators 12 of a dissimilar voltage potential. Insulator 35 of one applicator 12 prevents cross coupling of electric fields generated thereby with the electric fields of neighboring applicators 12. By electrically isolating each applicator 12 from its neighbors the multi-jet spray 37 of each applicator 12 can operate independently without influence from its neighboring applicators 12 which may be operating with one or more dissimilar charges.

In yet another embodiment, the electrical conductor 40 can be in the form of a solid conductor 32 as shown by cross-sections in FIGS. 2C-2D. The solid conductor 32 can be a thin diameter electrode made of for example tungsten with a nano-sharp needle tip, a partially blunt tip, or blunt tip. The length, positioning of the conduit 43, and thickness of the solid conductor 32 can be varied. Similar to the embodiments of FIGS. 2A-2B, the applicators 12 of FIGS. 2C-2D can utilize electrical insulators 35 to minimize electric field influences from neighboring applicators 12 operating with dissimilar electric charges.

The electric field emitted from the tip of the solid conductor 40 can be proportional to a ratio of the voltage applied to the conductor 40 and the diameter of the tip of the conductor 40. Under a condition for example where the voltage applied to the solid conductor 40 is constant, the electric field generated by the tip of a nano-sharp needle will be greater than the electric field generated by a blunt tip of a greater diameter. Accordingly, a nano-sharp needle conductor 40 can provide operational benefits in managing the charge density of a precursor solution flowing through the tube 30.

Although not shown, the foregoing embodiments can be combined. For instance the solid conductor of FIGS. 2C-2D can be combined with one of the sleeves 41 and 42 of FIG. 2A or 2B. In this embodiment, the solid conductor 32 can be surrounded by one of sleeves 41 and 42. In yet another embodiment, the sleeves 41 and 42 can be combined as concentric sleeves.

It should be evident from the above illustrations that the conductor 40 can have numerous embodiments, and that there can also be numerous placements of the conductor 40 in the conduit 43. These non-disclosed embodiments are contemplated by the present disclosure.

Figure 12:
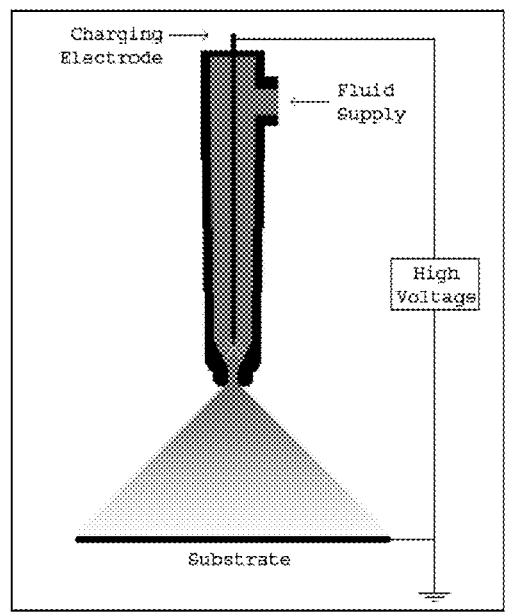
FIG. 12 depicts an illustrative embodiment of the applicator of the apparatus of FIG. 1 coupled to a power source.

The conductor 40 illustrated in FIGS. 2A-2D can be coupled by wire to one or more high voltage power supplies (see FIG. 12). A stable and repeatable multi-jet spray 37 can be applied to a substrate 18 by controlling the voltage applied to the conductor 40, the flow rate of the liquid 31 through the tube 30, the viscosity of the liquid and the dielectric constant of the solution, and the surface tension of the liquid 31, just to mention a few controllable parameters. Under the right parametric conditions, a stable multi-jet spray 37 can emanate such as to enable the applicator 12 to "consistently" apply desirable spray patterns on substrate 18.

Before an electrical charge is applied to the conductor 40, the liquid 31 can protrude from the egress opening 33 of the nozzle 50 in the form of a drop. The viscosity and surface tension properties ($F_y$) of the liquid can prevent it from causing a continuous flow from the egress opening 33 while the conductor 40 is in a neutral state. As a charge is applied to the liquid 31 by way of conductor 40, Coulomb repulsion forces caused by the surface charges on the liquid ($F_{elect}$) oppose the surface tension forces. With increasing charge density, a multi-jet spray 37 can be caused to emanate from the tube 30. The multi-jet spray 37 can be stabilized by selecting a desired viscosity and dielectric constant for the liquid 31, and controlling the flow rate of said solution through the tube 30.

Figure 11:
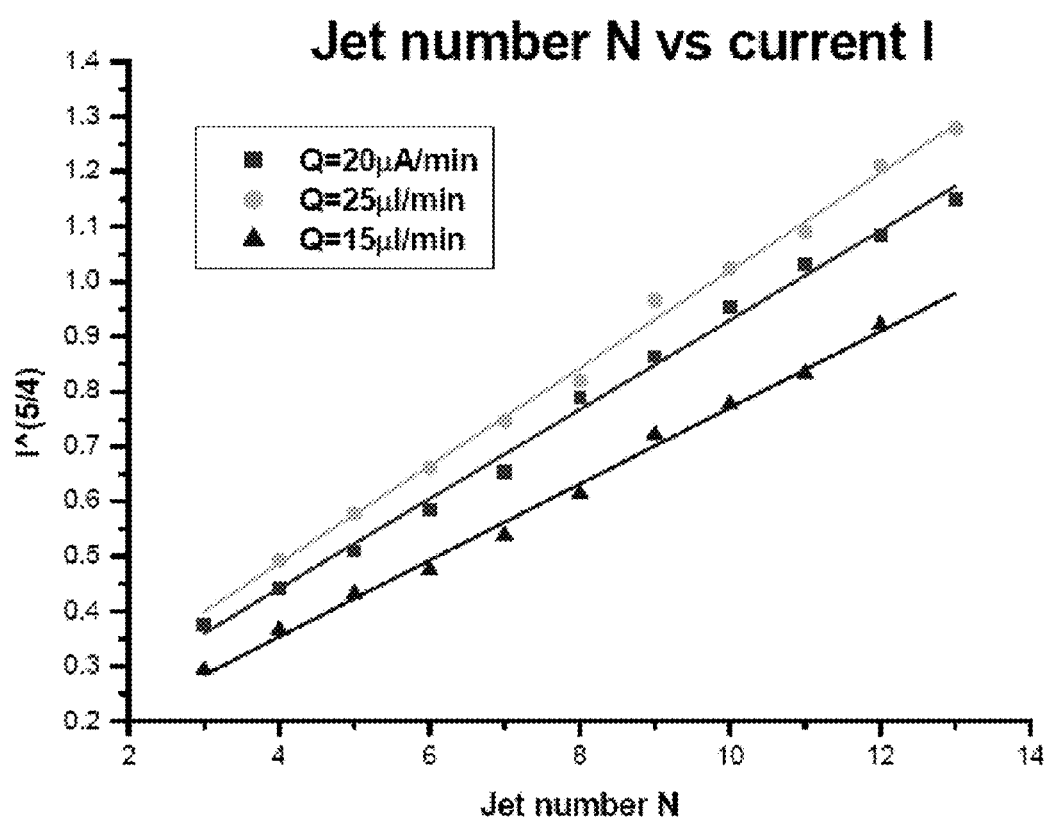
FIG. 11 depicts an illustrative embodiment of a graph that describes a relationship between a number of jet sprays generated by an applicator of the apparatus of FIG. 1 to a charge applied thereto.

FIGS. 3-10 provide several illustrations of a stable multi-jet spray 37 produced repeatedly in a stable manner by the applicators 12 of FIGS. 2A-2D. FIGS. 3-10 show how the applicator 12 can be controlled to generate as few as three evenly spaced jet sprays to 16 evenly jet sprays. FIG. 11 illustrates a graph depicting a relationship between a number of jet sprays produced by the applicator 12 as a result of a charge applied to the conductor 40 of the applicator 12. FIG. 11 shows that as the charge applied to the conductor 40 is raised the number of jet sprays generated by the applicator 12 increases in an approximately linear fashion ($I^{5/4}$). The radius (R) of the charged drops created by the jet spray can be determined as a function of current (I) and flow rate (Q) as follows:

$$R = (36\varepsilon T)^{1/3}\left(\frac{Q}{I}\right)^{2/3},$$

where $\varepsilon$ is the permittivity of the liquid, and T is the surface tension of the liquid The number of jet sprays (N) as a function of I and Q can be described by:

$$N = \left(\frac{\rho r^{12}}{2^{34}3^5\pi^2\varepsilon^5 T^6}\right)^{1/8} I^{5/4} Q^{-1}$$

$$\approx 0.019867\left(\frac{\rho r^{12}}{\varepsilon^5 T^6}\right)^{1/8} I^{5/4} Q^{-1}$$

where $\rho$ is the mass density of the liquid and r is the radius of the egress opening 33 of the nozzle 50.

Referring back to FIG. 2, the liquid 31 can comprise a precursor solution of a variety of materials such as metals, metalorganic compounds, metal salts, sol-gel processed materials, ceramics, polymers, oligomers, oxides, hydroxides, hydrides, and/or one or more solvents combined with any of these materials. Some materials such as polymers can be heated to a molten state if a solvent is not desirable for a particular application. Surfactants can also be used to vary the surface tension of the precursor solution. Binders such as polyethylene glycol and ethyl cellulose can also be used to vary the viscosity of the precursor solution to thereby maintain a pattern structure applied to the substrate 18 that can be later removed using heat treatment. Other binders are possible.

Metals can include for example silver or nickel from metalorganic precursors in solvent, silver from Dupont Fodel screen printable paste containing silver nanoparticles, or platinum from a precursor in Solaronix pastes. Polymers can include functional polymers such as PEDOT:PSS, P3HT or other polymers dispersed in solvent. Oxides can include titanium dioxide ($TiO_2$), titanium oxynitride (TiON) from metalorganic precursors in solvent, $TiO_2$ nanoparticle networks from Solaronix screen printable pastes, nickel oxide from metalorganic precursors in solvent, dielectric glass, or low-temperature glass from screen printable pastes.

The precursor solution can also comprise biomaterials and biological materials. For instance, the precursor solution can comprise a solution of chitosan, gelatin, alginate, agarose, peptides, proteins, therapeutic agents, cells, and DNA or protein molecules dispersed in solvent.

By choosing an appropriate precursor solution, the apparatus 10 can create films and nanoparticle applications of varying thicknesses, sizes, chemical compositions and stoichiometries.

The precursor solution created in any of these instances can also be controlled for a desired viscosity, conductivity, dielectric constant and surface tension. FIG. 26, Table 1 provides an illustration of precursor solutions that can be used for application on a substrate 18. FIG. 27, Table 2 further illustrates materials that have been deposited by apparatus 10 of FIG. 1, 2, 17, or 18. It should be noted that FIG. 26 Tables 1 and FIG. 27, Table 2 are illustrative and non-limiting as it would be apparent to an artisan with ordinary skill in the art that there are nearly limitless material solutions possible that can be utilized by apparatus 10 for spray applications. Other material solutions are therefore contemplated by the present disclosure.

There are also nearly limitless operational factors of the apparatus 10 which can be intentionally altered to create varied results in the jet sprays generated by the applicator 12 of the apparatus 10. These operational factors can include, for example, the flow rate of the precursor solution through the tube 30, the surface charge density created by the amount of charge applied by the conductor 40 controllable with a programmable power supply, the distance between the substrate 18 and the egress opening 33 (referred to herein as meniscus distance 36), and the multi-planar (1D, 2D or 3D) motion between the substrate 18 and the one or more jet sprays generated by the applicator 12. With so many combinations of precursor solutions and operation characteristics of the apparatus 10, innumerable film patterns can be applied to substrate 18.

Figure 23:
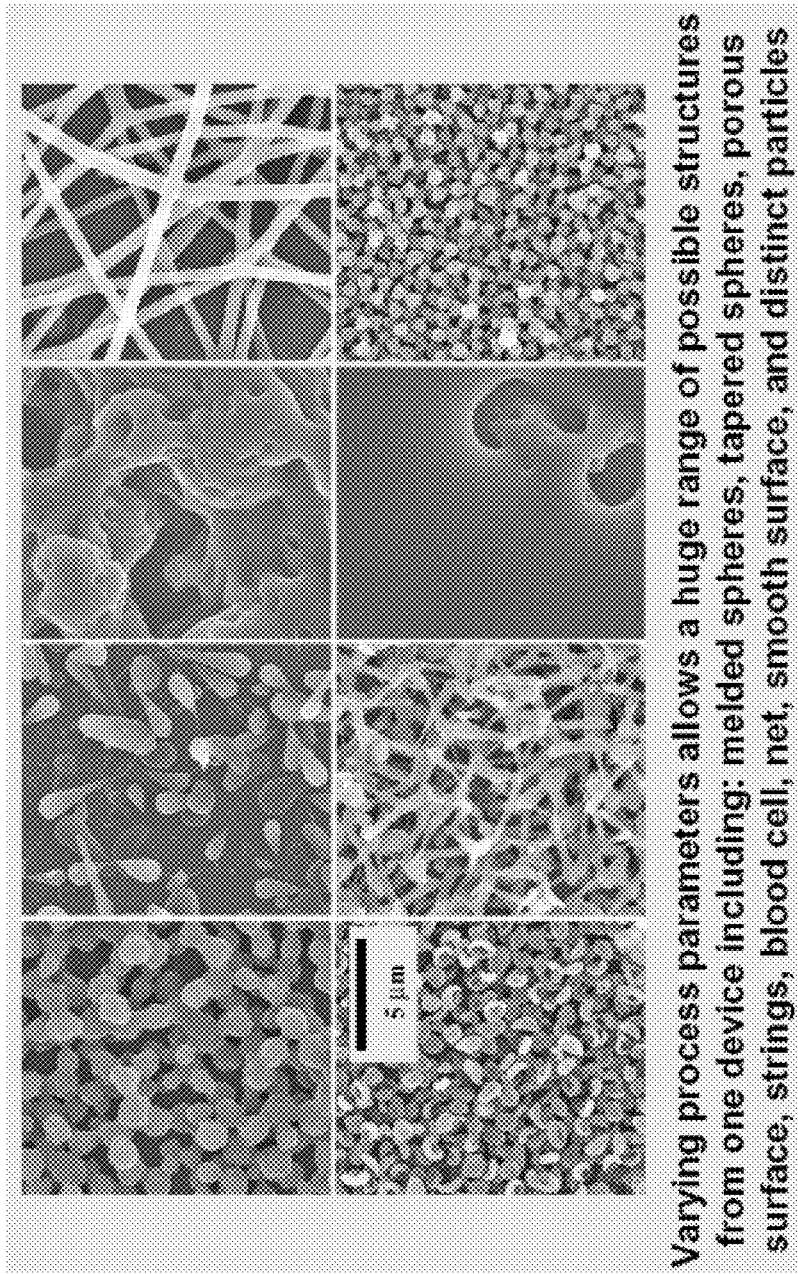
FIGS. 23-24 depict illustrative embodiments of films created by the apparatuses of FIGS. 1 and 18.
Figure 24:
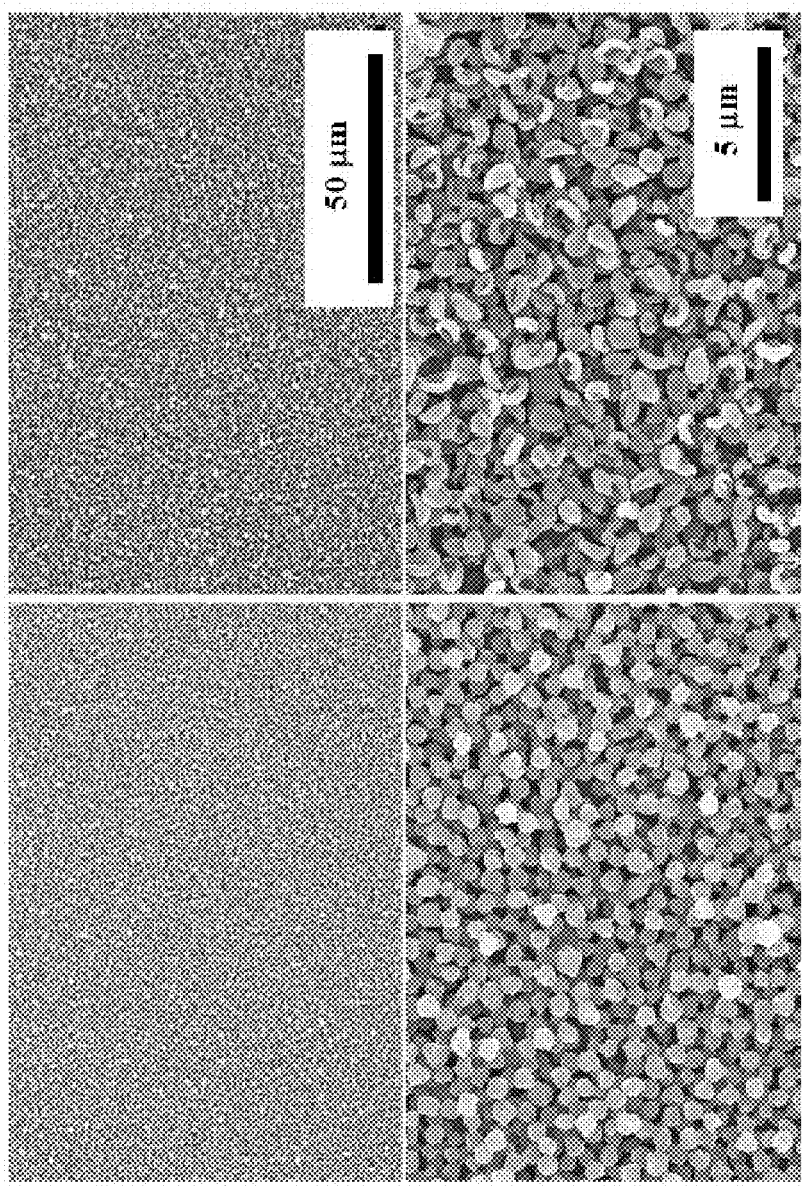

The spray patterns generated by apparatus 10 can vary in thickness, material characteristics (e.g., resistivity, vertical height, pattern spreading, other geometries), format (e.g., contiguous patterns, patterns with discontinuities), and so on. FIGS. 23-24 provide illustrative films created by the apparatus 10 of FIGS. 2A-2D. As shown in FIGS. 23-24, apparatus 10 of FIG. 2 can be used to fabricate thin films, nanoparticles, and nanofibers of desired sizes. Apparatus 10 is largely insensitive to the choice of materials and is scalable. Accordingly, other spray patterns are possible and contemplated by the present disclosure.

Figure 13:
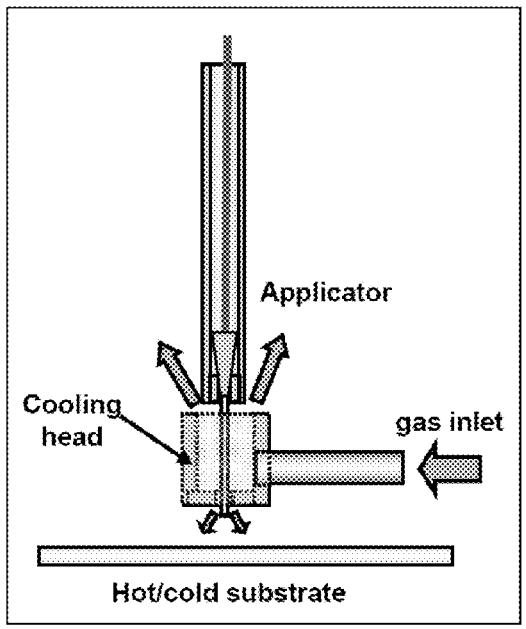
FIGS. 13-14 depict illustrative embodiments of housing assemblies which can be used to seal a portion of the apparatus of FIG. 1.
Figure 14:
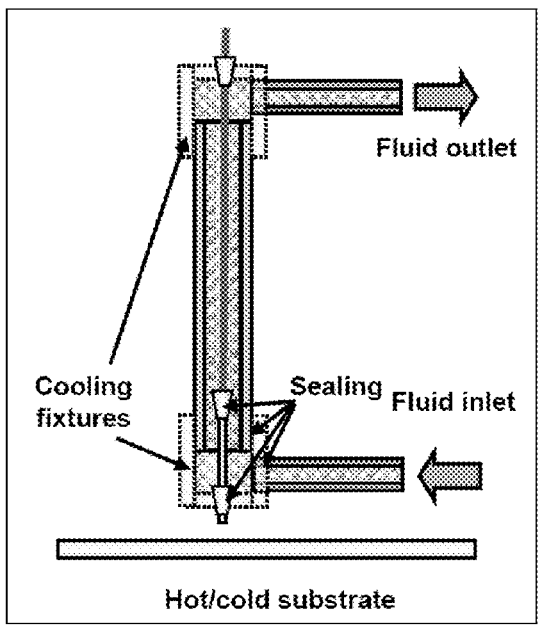

A housing assembly can be added to a portion of the apparatus 10 as shown in FIGS. 13 and 14. The housing assembly can be used to apply a gas or fluid for controlling a temperature of the precursor solution as it is being applied. The housing assembly can also be adapted to provide a hermetic seal with a portion of the nozzle 50 and the substrate 18 (not shown in FIG. 13 or 14). With a common pump or other mechanical extraction device, air and/or other gases can be extracted from the assembly to create a near vacuum seal. The housing assembly can be used in applications where environmental control of the application of precursor solutions is desirable.

Figure 15A:
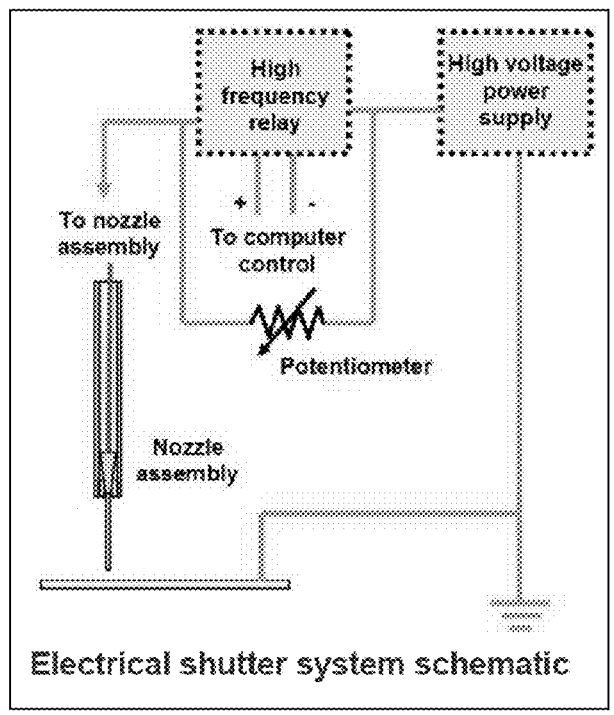
FIGS. 15A-15B depict illustrative embodiments to manage the application of a film on a substrate.
Figure 15B:
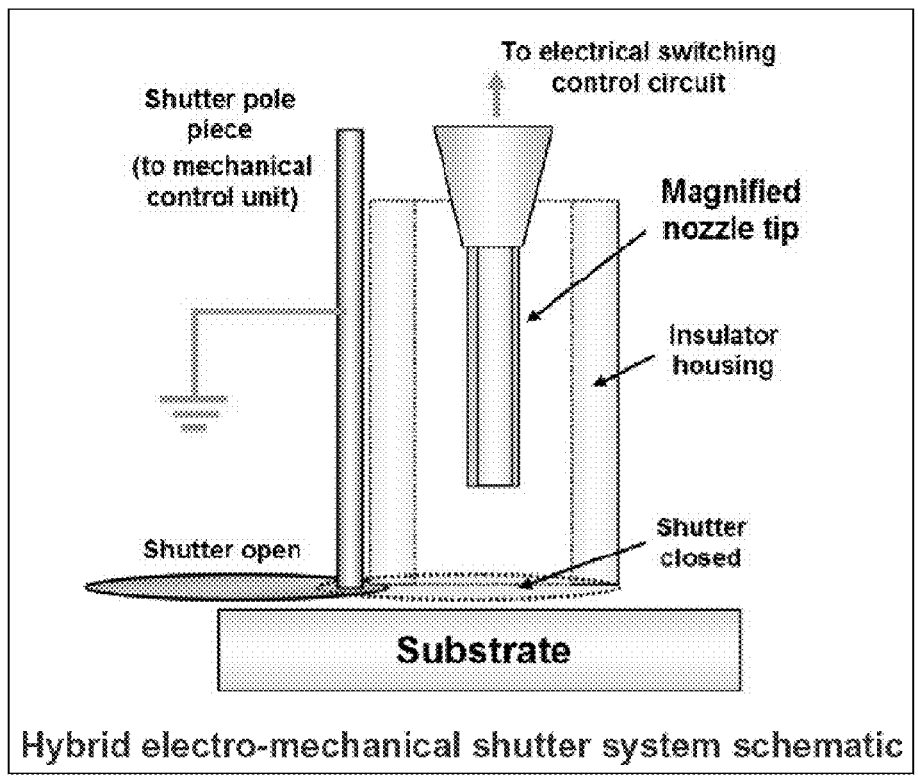

Other accessory devices can be used with apparatus 10 to control its operational characteristics. For example, a common temperature application device can be coupled to the substrate 18 to either heat or cool the substrate 18 during material application. In yet another embodiment, an electrical or electro-mechanical shutter system as shown in FIGS. 15A and 15B, respectively, can be used to generate discontinuous patterns at high speed. The electrical shutter system can rely on the surface tension of the precursor solution to prevent continuous flow when the conductor 40 is in a neutral charge state, while the electro-mechanical shutter can combine both the electrical shutter concept with a mechanical shutter that can be controlled to obstruct or enable application with a common actuator mechanism.

Figure 16:
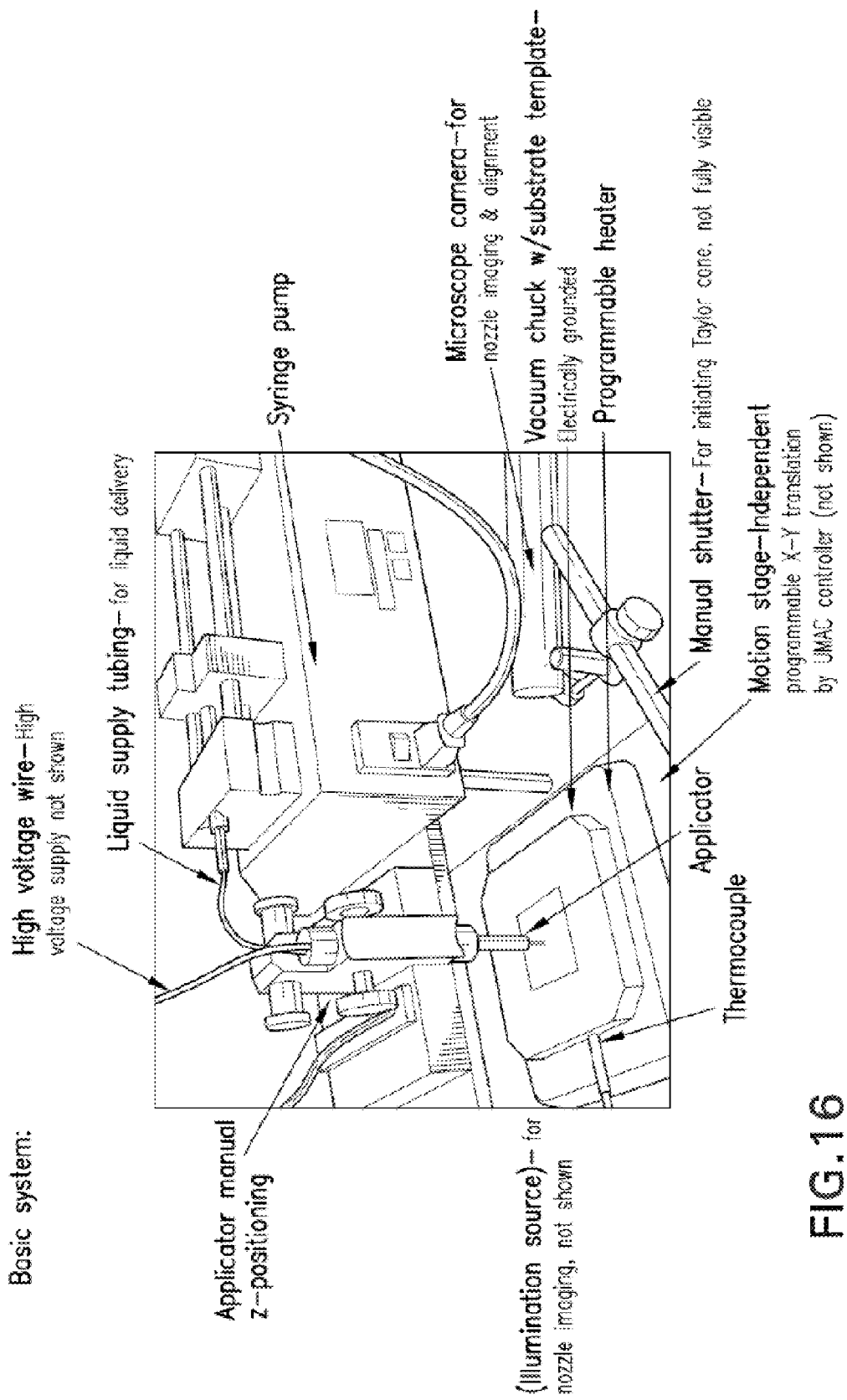
FIG. 16 depicts an illustrative embodiment of accessories that can be used by the apparatus of FIG. 1 to enhance and/or monitor the application of materials by the apparatus.

Several operational devices can be added to the apparatus 10 for quality control. For instance, a thermal sensor can be used to measure the temperature of the substrate 18 and/or the precursor solution during application. The thermal sensor can be a common temperature sensor coupled to substrate 18, or an infrared sensor that can measure the temperature of the precursor solution while being applied. Additionally, an imaging sensor such as a microscope camera can be used to monitor the application process for accuracy. These additional components are shown in FIG. 16.

Figure 18:
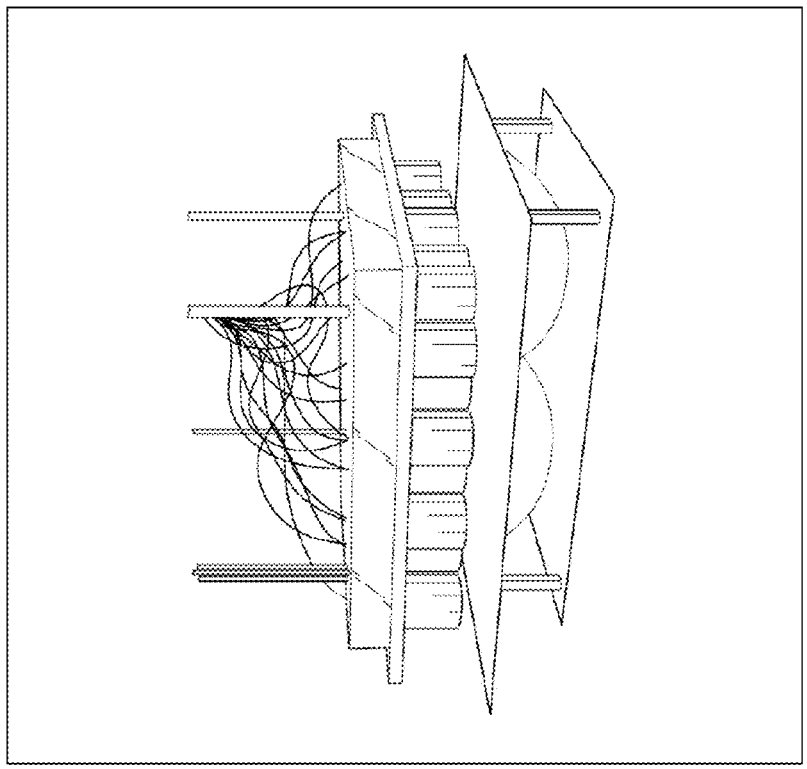
FIGS. 17-18 depict illustrative embodiments of a multi-applicator apparatus.
Figure 17:
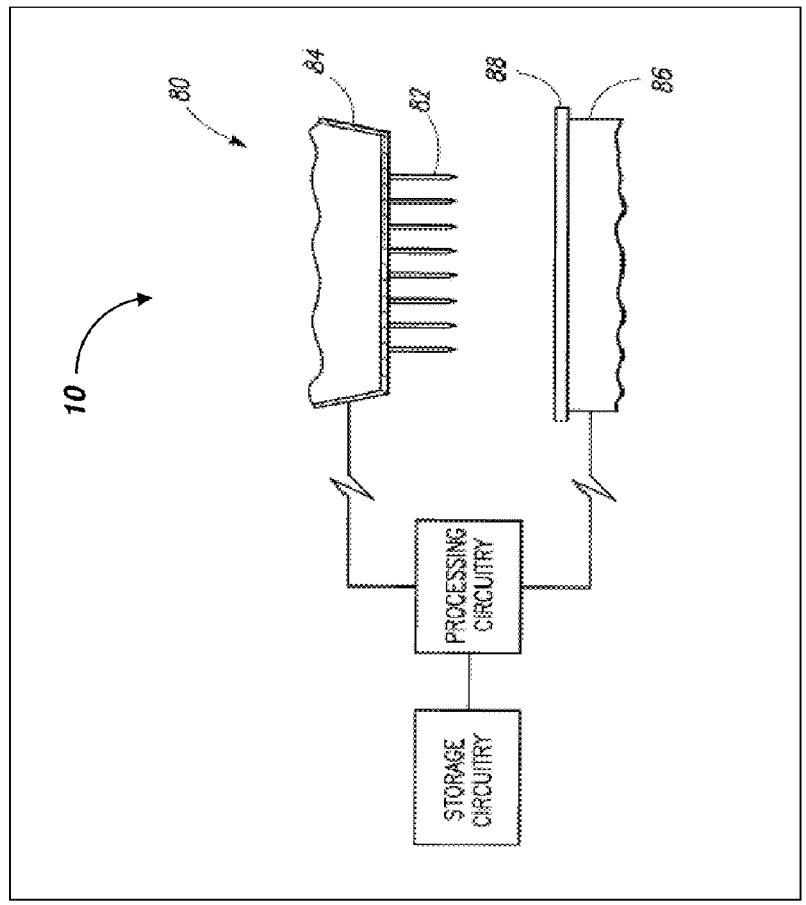

The apparatus 10 can also be adapted to have a plurality of nozzles 82 as shown in FIG. 17. The plurality of nozzles 82 can share a common reservoir 84, or each nozzle can be coupled to an independent fluid injection device, each providing a unique precursor solution managed by the processing circuitry 20 discussed previously. The plurality of nozzles 82 can generate multi-jet sprays that can be applied synchronously or asynchronously between nozzles to form a variety of spray patterns on a single substrate 88 controlled by a staging device 86. Alternatively, the plurality of nozzles 82 can be used to apply spray patterns on a plurality of substrates each individually controlled by its own stage. In yet another embodiment, portions of the plurality of nozzles 82 can also be coupled to a staging device so that the nozzles and/or the substrate can be moved relative to each other in any direction as described earlier for the apparatus of FIG. 1B. FIG. 18 illustrates an apparatus 10 with 40 nozzles each coupled to a syringe pump.

It should be evident from the abovementioned operational characteristics of the apparatus 10 with a single nozzle (or multiplicity of nozzles) that there can be endless operational configurations of the apparatus 10 which can control the application of materials on one or more substrates. It would be impractical to describe all the possible embodiments in the present disclosure. Nevertheless, these non-disclosed embodiments are contemplated and therefore considered relevant to the potential use of the apparatus 10 as described herein.

Figure 19:
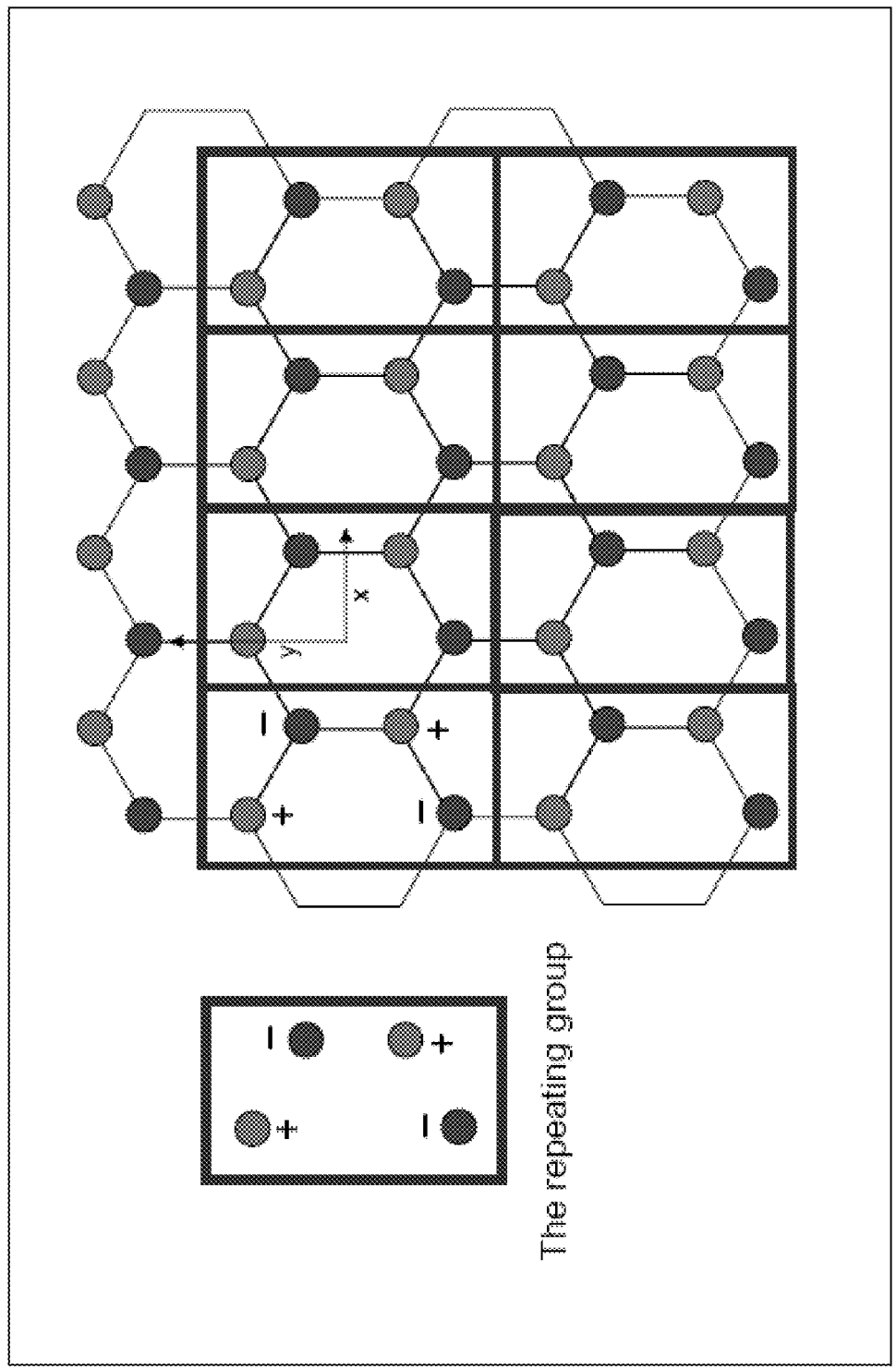
FIG. 19 depicts an illustrative embodiment of a two dimensional array of the multi-applicator apparatus of FIGS. 17-18 arranged in a repeated grouping of multi-polarity applicators.
Figure 20:
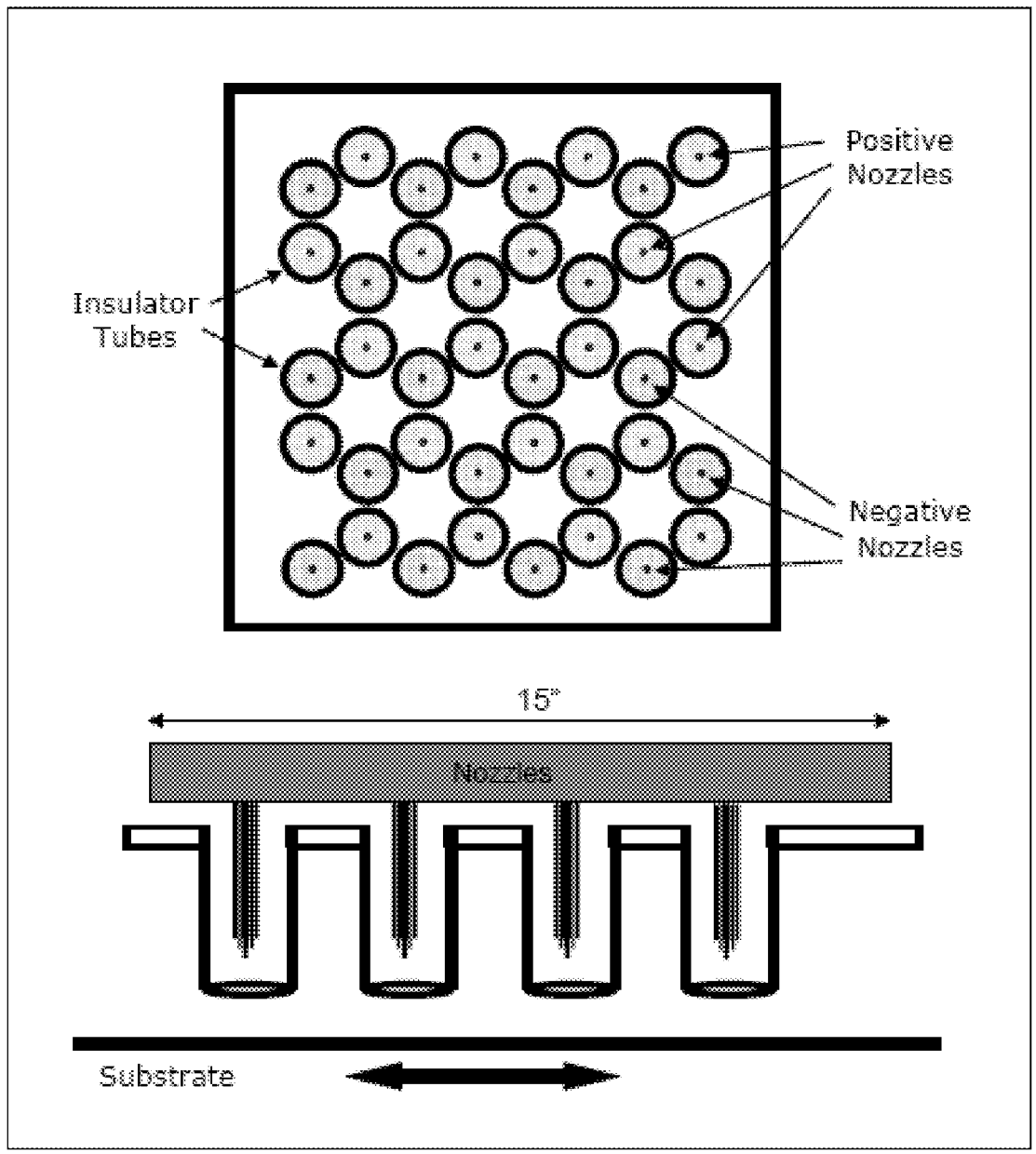
FIG. 20 depicts an illustrative embodiment of a two dimensional array of 40 applicators arranged in a structure with a repeated grouping of multi-polarity applicators insulated from each other.

The multi-applicator apparatus 10 of FIG. 18 can be adapted to apply precursor solutions on a substrate with one or more net charges. To accomplish this, the 40 applicators 12 of the apparatus 10 of FIG. 18 can be arranged for example in a two dimensional array as shown in FIGS. 19-20. In addition, the array can be arranged with repeatable groups of applicators 12 which can produce one or more jet sprays of varying polarity per applicator 12 in response to one or more power supplies varying the applied voltage of these applicators 12 groups. In this illustration, for example, two applicators 12 generate one or more jet sprays at one polarity while the other two applicators 12 generate one or more jet sprays of an opposing polarity.

Figure 22:
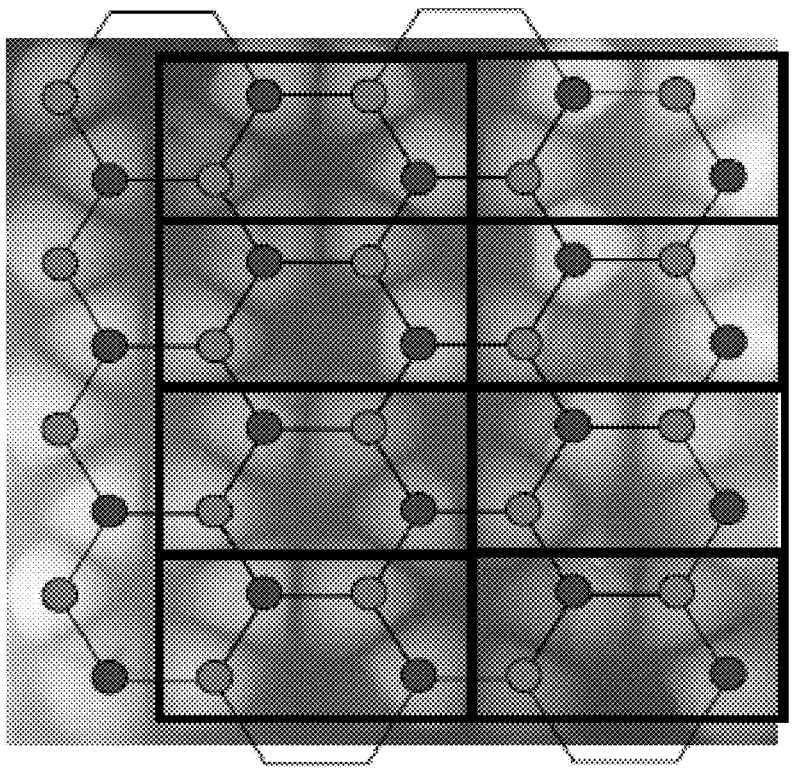
FIG. 22 depicts an illustrative embodiment of FIG. 21 with the multi-applicator structure of FIG. 19 superimposed.
Figure 21:
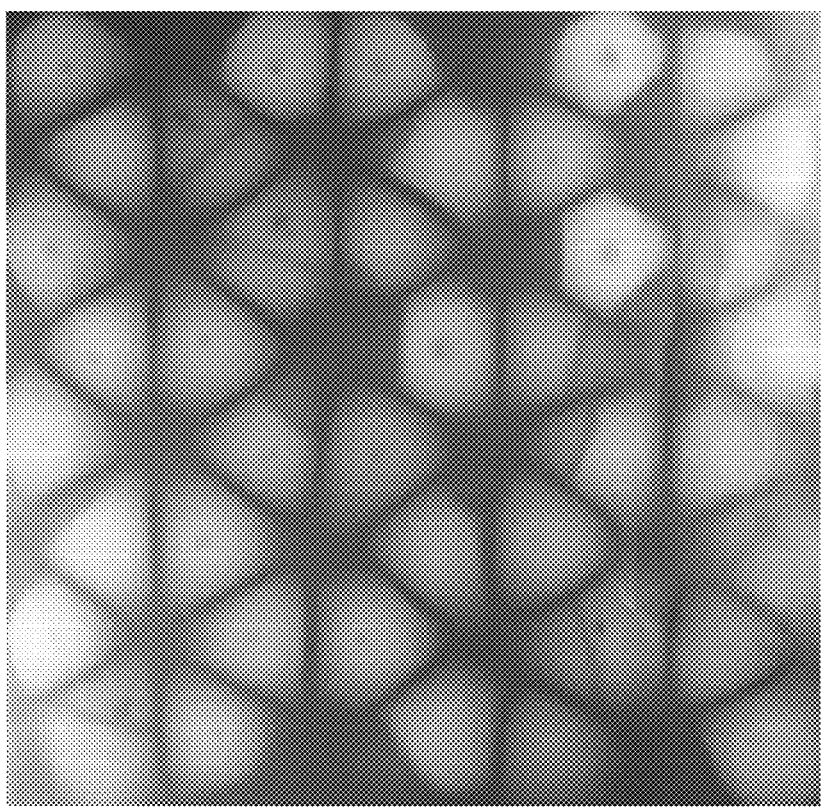
FIG. 21 depicts an illustrative embodiment of a spray pattern on a substrate obtained with the 40-applicator apparatus of FIG. 18.

With this arrangement precursor nanodrops generated by the multi-polarity jet sprays repel each other, and can be controlled to apply on a substrate a uniform conformal coating of films or nanoparticles of substantially a neutral net charge. Such applications can take place on flat or curved surfaces with three dimensional structures. The apparatus 10 of FIG. 18 can be adapted to move the substrate in its own plane such that any point on the substrate represents an average in time over a region covered by a group of multi-polarity jet sprays thus enabling uniform deposition of the liquid throughout the substrate to form a thin film. An illustration of such an application is shown in FIG. 21 with the multi-applicator structure of FIG. 19 superimposed thereon in FIG. 22. Although there are gaps between the film applications of FIG. 21, the substrate and/or the applicators 12 of FIG. 18 can be moved relative to each other to create a thin continuous film of substantially a neutral net charge.

It would be apparent to an artisan with ordinary skill in the art that other arrangements other than the structure of FIGS. 19-22 can be used. It would also be apparent to said artisan that it may be desirable to create portions of the substrate with varying net charges. This latter embodiment can be accomplished by varying the charge applied to portions of the applicators 12. The dissimilar charges do not have to be of opposing polarities. For instance, positive charges of different voltage potentials can be applied to a number of the applicator 12 groups in the structure of FIG. 19 to create portions of an application on the substrate with one or more net charges.

Accordingly, one portion can have a net positive charge that is higher or lower than a neighboring portion created by another applicator group. Any combination of positive or negative net charges can be created on a per applicator basis or by desired applicator group patterns. By electrically insulating each applicator 12 in any suitable arrangement, each applicator 12 is prevented from electro-statically influencing neighboring applicators so that any charged jet spray combination is possible.

With an arrangement such as in FIGS. 18-20 applications can be carried out on large substrates in a short period of time with a high degree of repeatability. FIG. 28, Table 3 shows thickness variation in a PEDOT:PSS thin film deposited using the 40-nozzle array of FIG. 18 over a 12"×12" glass substrate. The height units in FIG. 28, Table 3 are in angstroms. Thin film thickness is measured at 64 points distributed uniformly over the glass substrate. For a mean thickness of 308 nm, the standard deviation in thickness is approximately 10% of the mean. It should be evident from the results of FIG. 28, Table 3 (and the illustrations of FIG. 26, Table 1 and FIG. 27, Table 2 and FIGS. 23-24) that highly uniform applications of various sizes, materials and structures are possible.

It would be apparent to an artisan with ordinary skill in the art after reviewing the above disclosure that any of the foregoing embodiments can be adapted in numerous ways without departing from the scope and spirit of the claims described below. Accordingly, the reader is directed to the claims for a fuller understanding of the breadth and scope of the present disclosure.

Figure 25:
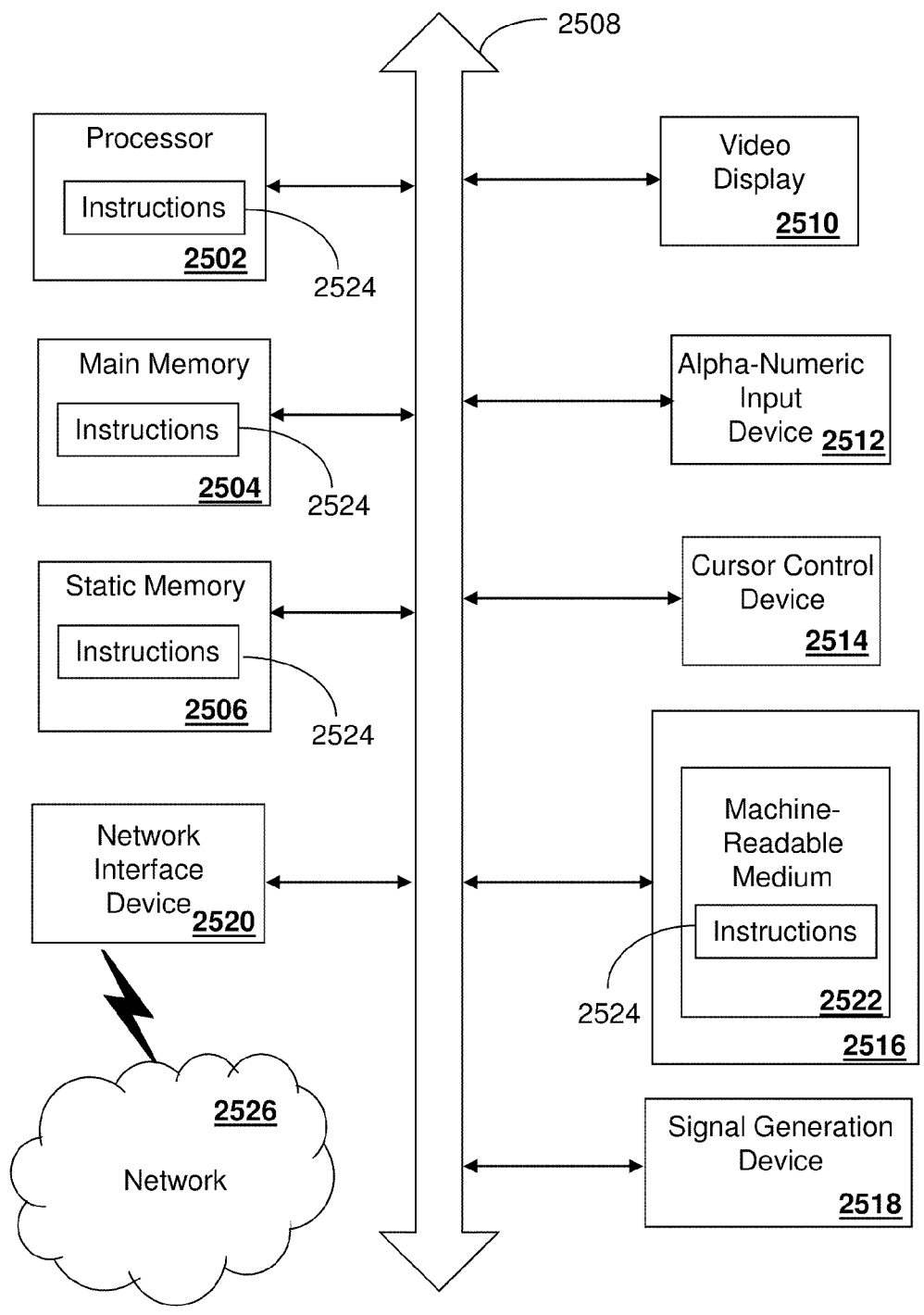
FIG. 25 depicts an illustrative diagrammatic representation of a machine in the form of a computer system within which a set of instructions, when executed, may cause the machine to perform any one or more of the methodologies disclosed herein.

FIG. 25 depicts an illustrative diagrammatic representation of a machine in the form of a computer system 2500 within which a set of instructions, when executed, may cause the machine to perform any one or more of the methodologies discussed above on the apparatus 10 and/or its peripherals. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 2500 may include a processor 2502 (e.g., a central processing unit (CPU), a graphics processing unit (GPU, or both), a main memory 2504 and a static memory 2506, which communicate with each other via a bus 2508. The computer system 2500 may further include a video display unit 2510 (e.g., a liquid crystal display (LCD), a flat panel, a solid state display, or a cathode ray tube (CRT)). The computer system 2500 may include an input device 2512 (e.g., a keyboard), a cursor control device 2514 (e.g., a mouse), a disk drive unit 2516, a signal generation device 2518 (e.g., a speaker or remote control) and a network interface device 2520.

The disk drive unit 2516 may include a machine-readable medium 2522 on which is stored one or more sets of instructions (e.g., software 2524) embodying any one or more of the methodologies or functions described herein, including those methods illustrated above. The instructions 2524 may also reside, completely or at least partially, within the main memory 2504, the static memory 2506, and/or within the processor 2502 during execution thereof by the computer system 2500. The main memory 2504 and the processor 2502 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 2524, or that which receives and executes instructions 2524 from a propagated signal so that a device connected to a network environment 2526 can send or receive voice, video or data, and to communicate over the network 2526 using the instructions 2524. The instructions 2524 may further be transmitted or received over a network 2526 via the network interface device 2520.

While the machine-readable medium 2522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
    applying dissimilar electrical charges to portions of a plurality of applicators by way of a conductor included in a conduit of each applicator; and
    responsive to the applied dissimilar electrical charges, causing each applicator to generate one or more jet sprays of a liquid received by each applicator for application of a material on a substrate, wherein one or more portions of the material on the substrate have one or more net charges associated with the dissimilar electrical charges applied to the portions of the plurality of applicators, wherein the conductor of each applicator is a sleeve positioned in the applicator, and wherein a diameter of the sleeve results in one of an outer surface of the sleeve contacting a surface of the conduit, or the outer surface of the sleeve having a separation from the surface of the conduit of the applicator.

2. The method of claim 1, wherein the applied material comprises a film, and wherein the method comprises controlling the one or more net charges of one or more portions of the film.

3. The method of claim 1, wherein each applicator comprises one of a tube or a nozzle.

4. The method of claim 1, wherein the plurality of applicators are arranged in a two dimensional array of applicators.

5. The method of claim 4, wherein the two dimensional array of applicators are arranged in periodic groups of applicators having a varying polarity to create an electric field distribution.

6. The method of claim 1, wherein each applicator is insulated to prevent electrostatic influence by neighboring applicators of opposite polarity.

7. The method of claim 1, wherein the substrate is one of a conducting substrate or an insulating substrate.

8. The method of claim 1, wherein when the outer surface of the sleeve of at least one of the plurality of applicators is separated from the surface of the conduit of the at least one applicator the sleeve of the at least one applicator comprises a solid conductor.

9. The method of claim 8, wherein the solid conductor comprises a nano-sharp needle tip.

10. The method of claim 1, wherein the substrate is coupled to a position altering apparatus to shift the substrate in at least one plane.

11. The method of claim 10, wherein the position altering apparatus moves the substrate in the at least one plane such that any point on the substrate represents an average in time over a region covered by a group of multi-polarity jet sprays thus enabling uniform deposition of the liquid throughout the substrate to form a film.

12. A method, comprising:
    manufacturing a device by applying dissimilar electrical charges to portions of a plurality of applicators by way of a conductor included in a conduit of each applicator;
    wherein the applied dissimilar electrical charges cause each applicator to generate one or more jet sprays of a liquid received by each applicator for application on a component of the device;
    wherein one or more portions of the applied material on the component have one or more net charges associated with the dissimilar electrical charges applied to the portions of the plurality of applicators; and
    wherein the conductor of each applicator is a sleeve positioned in the applicator, wherein a diameter of the sleeve results in one of an outer surface of the sleeve contacting a surface of the conduit, or the outer surface of the sleeve having a separation from the surface of the conduit of the applicator.

13. The method of claim 12, wherein the plurality of applicators are arranged in a two dimensional array of applicators.

14. The method of claim 13, wherein the two dimensional array of applicators are arranged in periodic groups of multi-polarity applicators to create an electric field distribution.

15. The method of claim 12, wherein the device comprises one of a component of a computer, a display, an integrated circuit, a printed circuit board, a wafer, or portions thereof.

* * * * *